United States Patent [19]

Bayliss et al.

[11] 4,415,969
[45] Nov. 15, 1983

[54] MACROINSTRUCTION TRANSLATOR UNIT FOR USE IN A MICROPROCESSOR

[75] Inventors: John A. Bayliss, Portland; Stephen R. Colley, Aloha; Roy H. Kravitz; William S. Richardson, both of Beaverton; Dorn K. Wilde, Aloha, all of Oreg.; Gurdev Singh, Los Gatos, Calif.

[73] Assignee: Intel Corporation, Santa Clara, Calif.

[21] Appl. No.: 119,433

[22] Filed: Feb. 7, 1980

[51] Int. Cl.³ .......................... G06F 9/00; G06F 9/22; G06F 9/30
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,075,687 | 2/1978 | Nissen et al. | 364/200 |
| 4,118,776 | 10/1978 | Isomura | 364/200 |
| 4,126,896 | 11/1978 | Yamazaki | 364/200 |
| 4,130,869 | 12/1978 | Kinoshita et al. | 364/200 |
| 4,131,943 | 12/1978 | Shiraogawa | 364/200 |

*Primary Examiner*—Gareth D. Shaw
*Assistant Examiner*—John G. Mills
*Attorney, Agent, or Firm*—Owen L. Lamb

[57] ABSTRACT

An instruction translator unit which receives an instruction stream from a main memory of a microprocessor, for latching data fields, for generating microinstructions necessary to emulate the function encoded in an instruction, and for transferring the data and microinstructions to a microinstruction execution unit over an output bus. The instruction unit includes an instruction decoder (ID) which interprets the fields of received instructions and generates single forced microinstructions and starting addresses of multiple-microinstruction routines. A microinstruction sequencer (MIS) accepts the forced microinstructions and the starting addresses and places on the output bus correct microinstruction sequences necessary to execute the received instruction. The microinstruction routines are stored in a read-only memory (ROM) in the MIS. The starting addresses received from the ID are used to index into and to fetch these microinstructions from the ROM. Forced microinstructions bypass the ROM and are transferred directly by the MIS to the execution unit.

The ID processes macroinstructions comprised of variable bit length fields by utilizing an extractor in conjunction with a bit pointer (BIP) for stripping off the bits comprising a particular field. The extracted field is presented to a state machine which decodes the particular field and generates data, microinstructions and starting addresses relating to the particular field for use by the MIS. The state machine then updates the BIP by the bit count of the particular field so that it points to the next field to be extracted.

13 Claims, 16 Drawing Figures

INSTRUCTION UNIT

FIG.3
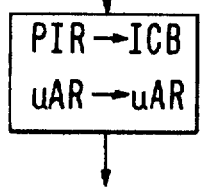
FIG.4
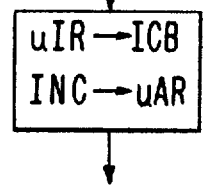
FIG.5 FIG.6 FIG.7
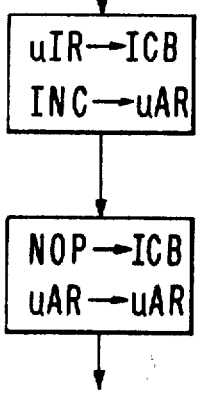 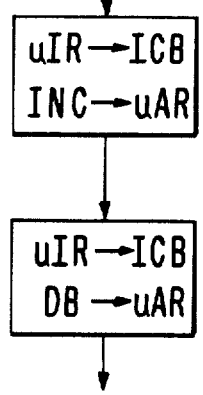 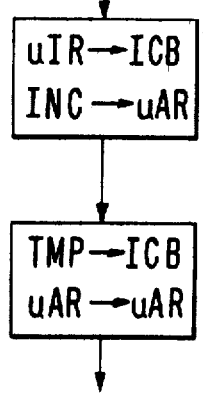
FIG.8
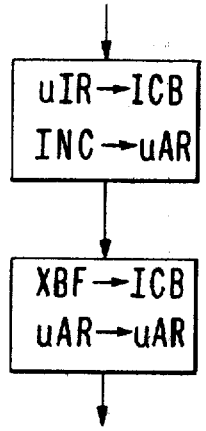
FIG.9
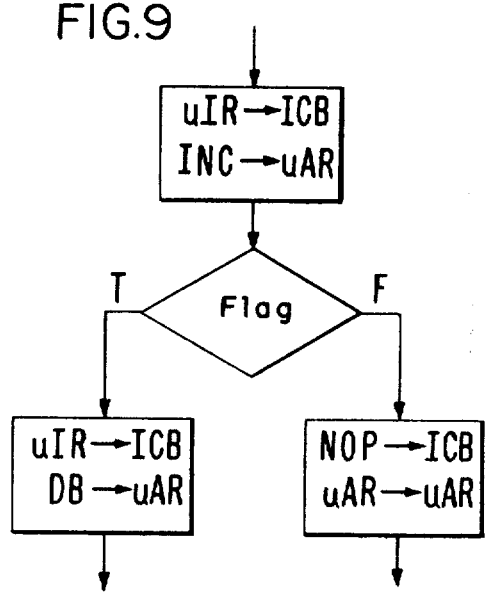

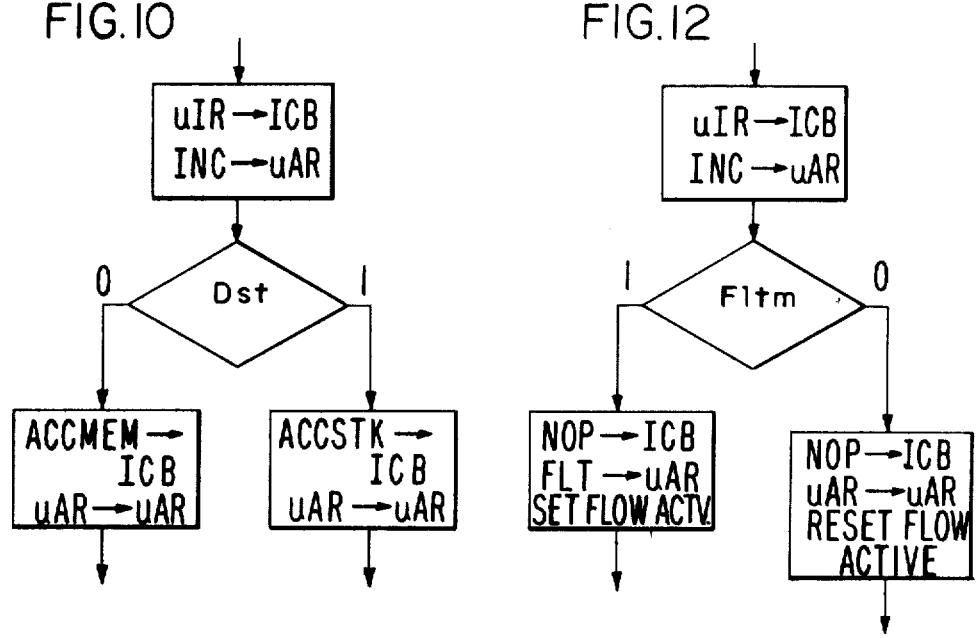
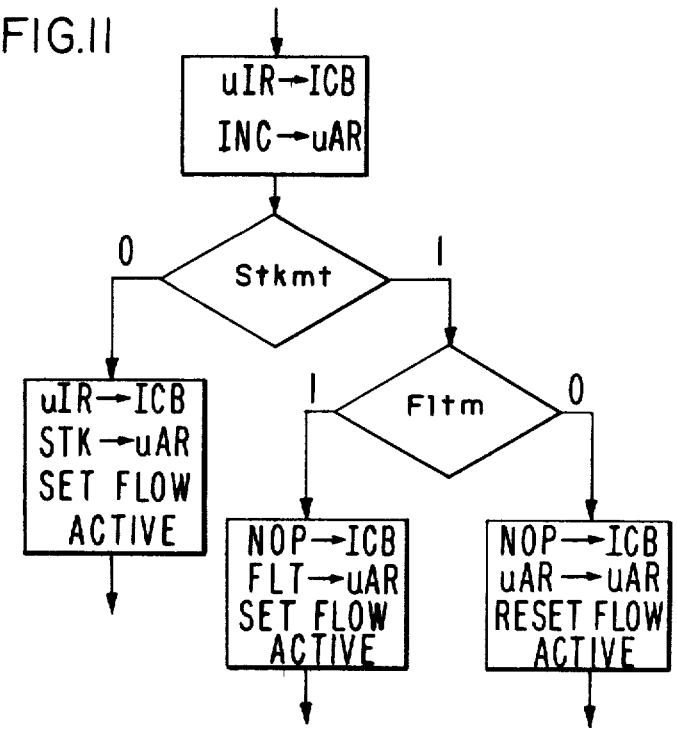

MACROINSTRUCTION TRANSLATOR UNIT FOR USE IN A MICROPROCESSOR

BACKGROUND OF THE INVENTION

1. Field of the Invention

The present invention relates to data processing systems, and more particularly to an improved instruction translator unit for decoding macroinstructions and for generating microinstructions necessary for an execution unit to emulate the function encoded in the macroinstruction.

2. Description of the Prior Art

In U.S. Pat. No. 4,325,120 Stephen R. Colley et al entitled "Data Processing System" granted on Mar. 13, 1982, is disclosed an object-oriented data processor architecture which takes full advantage of recent advances in the state-of-the-art of very large-scale, integrated circuit technology. The patent application describes a general-purpose processor which is able to perform generalized computation over a wide spectrum of data types supported by the architecture. Such a complex microprocessor requires a number of complex logical circuits. With present-day integrated-circuit technology, this complex microprocessor is too large to be fabricated on a single chip and therefore it must be partitioned and fabricated on a number of chips. Several factors must be considered in determining where to partition this logic. One must consider the distribution of heat dissipation over the chips and balance this dissipation as uniformly as possible. Furthermore, effective communication between chips should be handled with a minimum amount of interconnections. Finally, there should be a clean flow of information with a minimum amount of chip-to-chip feedback to complete a particular flow. This is because transferring data back-and-fourth across chip boundaries requires time, power, and buffering. Therefore, an optimum partitioning minimizes the number of cycles necessary to perform a function. As described in the above-identified Colley, et al patent, the microprocessor is partitioned between two chips with an instruction unit on one chip and an execution unit on another chip. Communication between chips is performed over an interchip bus. Off-chip communication with external devices, such as input/output devices, is accomplished over an interface more fully described in U.S. Pat. No. 4,315,308 entitled "Microprocessor Interface between a Microprocessor Chip and Peripheral Subsystems, " by Daniel K. Jackson, Ser. No. 972,007, filed on Dec. 21, 1978.

The following is a summary of some of the prior approaches to the problem of partitioning a microprocessor among a number of integrated circuit chips.

In Hoff, Jr. et al U.S. Pat. No. 3,821,715 a microprocessor is partitioned at the memory interface and is fabricated on several chips. Each memory subsystem includes decoding circuitry to determine which of the plurality of memory chips is being addressed by the central processing unit. This patent represents those types of systems wherein memories are fabricated on separate chips and are coupled to a common data bus and coupled to the CPU. The present invention is concerned with partitioning the microprocessor at the instruction unit, execution unit interface.

The Walker U.S. Pat. No. 3,918,030 discloses a microprocessor which is partitioned at the instruction unit decoder for the replication of functions. A number of instruction decoders are provided, each comprising a separate package which responds to one—and only one—instruction. The present invention relates to a different approach in which the instruction decoder within the instruction unit receives all instructions and decodes them accordingly, thereby implementing a pipelined architecture.

U.S. Pat. No. 3,984,813 discloses a microprocessor that is partitioned between two chips, with the memory on one chip, and the CPU on another chip. The CPU chip incorporates all of the standard elements of a CPU, but does not contain a program counter. The dedicated program counter, on another chip, is driven in synchronism with the operation of the CPU so that appropriate control signals are transmitted from the CPU to control the program counter. The patent does not disclose how to optimize the partitioning of a CPU which is too large to fit on one chip, such as that described above with reference to the Colley, et al patent application.

Finally, the Cockerill, et al U.S. Pat. No. 4,057,846 discloses a pipelined microprocessor; howeer, it does not teach one how to utilize pipelining techniques to partition a microprocessor between two chips.

It is a primary object of the present invention to provide an instruction unit for receiving macroinstructions and for generating a series of microinstructions for utilization by an execution unit which is fabricated on a separate chip.

It is a further obect of the present invention to provide an instruction unit which is capable of generating microinstruction sequences for one macroinstruction, while decoding and interpreting the fields of a next macroinstruction.

It is also an object of this invention to provide an instruction unit which processes variable-bit-length instructions.

A further object of the invention is to provide an instruction unit which provides a clean flow of microinstructions to an external execution unit with a minimum amount of feedback from said execution unit to complete a particular flow.

BRIEF SUMMARY OF THE INVENTION

Briefly, the above objects are accomplished in accordance with the invention by providing a microprocessor instruction unit which includes an instruction decoder (ID) for receiving macroinstructions from a main memory and a microinstruction sequencer (MIS) for sequencing through microinstruction flows necessary to execute the received macroinstructions. The MIS includes means for receiving starting addresses for microinstruction routines which are stored in the MIS. The MIS also includes means for receiving forced microinstructions for single-microinstruction routines.

Buffering means are provided between the ID and the MIS for buffering the forced microinstructions. Control means are provided under control of the MIS for inhibiting the generation by the ID of new forced instructions whenever the buffer is full. Thus, the MIS may be sequencing through a number of microinstructions necessary to execute a given macroinstruction while the ID is decoding and interpreting the fields of a new macroinstruction and possibly filling the buffer with the forced microinstructions relating to the new macroinstruction.

In accordance with an aspect of the invention, means are provided for placing the ID in a look-ahead mode whenever the ID is processing a macroinstruction which is subsequent to one being processed by the MIS. When in this mode, the MIS is prevented for accepting a forced microinstruction from said buffer.

In accordance with a still further aspect of the invention, means are provided in the MIS for accepting a starting address from the ID only when a prior flow has been completed and when the forced microinstruction buffer is empty, thereby ensuring that all prior macroinstructions have been completed.

The invention has the advantage that by making the ID and MIS separate processors capable of operating independently, the ID is able to fetch and commence interpreting a macroinstruction while the MIS is processing a previous macroinstruction (i.e., go into a lookahead mode). This provides improved throughput in situations where otherwise the macroinstruction sequencer would be generating "no-op" microinstructions on successive cycles while waiting for the instruction decoder to interpret a new instruction.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein:

FIGS. 3 and 4 are flow diagrams illustrating single-cycle microinstructions;

FIGS. 4-12 are flow diagrams illustrating double-cycle microinstructions;

TABLE OF CONTENTS

Figure 1:
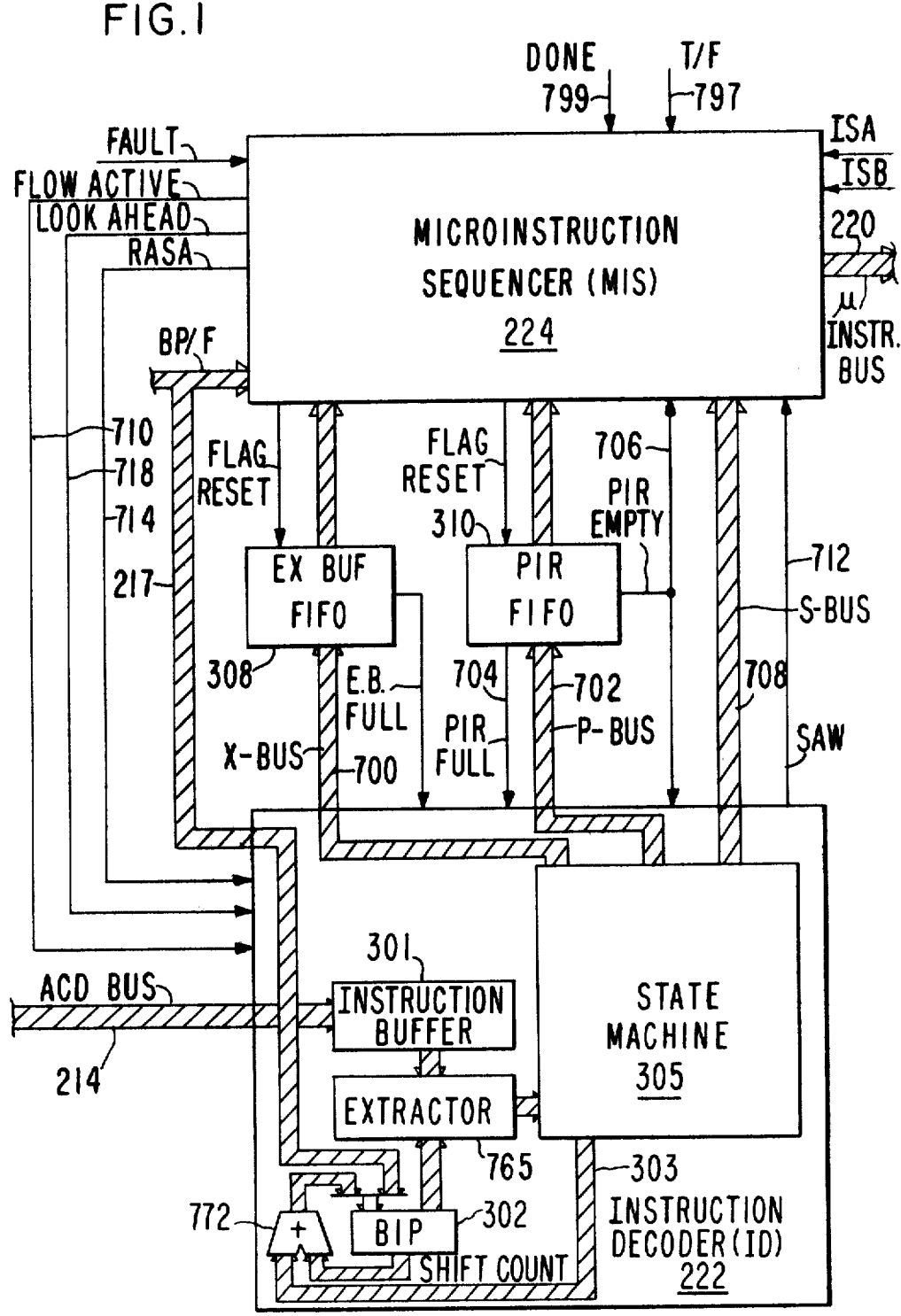
FIG. 1 is a functional block diagram illustrating the major components of the instruction unit of the present invention.

Background of the Invention
Brief Summary of the Invention
Brief Description of the Drawings
Table of Contents
Introductory Description of the Invention
PART I.
1.0 Instruction Decoder (ID)
  1.1 General
  1.2 Functional Block Description
    1.2.1 The PLA Logic
      1.2.1.1 SPLA and SREG Logic
      1.2.1.2 OPLA Logic
      1.2.1.3 The ESC Multiplexer
      1.2.1.4 The LREG
      1.2.1.5 TROM and TROM Multiplexer
    1.2.2 The Extractor Logic
      1.2.2.1 Composer Matrix and Extr. Reg. FIFO
      1.2.2.2 The Extractor Register Control Logic
      1.2.2.3 EXBUF Encoder and Control
    1.2.3. BIP Bus Logic
      1.2.3.1 The Bit Pointer Update Logic
      1.2.3.2 The TBIP Logic
      1.2.3.3 The BIP Stack
PART II.
2.0 Microinstruction Sequencer (MIS) Description
  2.1 The Interchip Bus (ICB)
    2.1.1 PIR FIFO
    2.1.2 Microinstruction ROM
    2.1.3 TMP Stack
    2.1.4 Constant Microinstruction ROM
    2.1.5 XBUF FIFO
    2.1.6 FREG
    2.1.7 The PLA IN Register
  2.2 The Decoder Bus (DB)
  2.3 Micro Address Bus (MAB)
    2.3.1 Micro Address Register (MAR)
    2.3.2 The Starting Address Register (SAR)
    2.3.3 The Incrementer (INC)
    2.3.4 The Micro Address Stack
    2.3.5 Fault ROM (FROM)
    2.3.6 Constant Micro Addresses
  2.4 MIS Control Logic
    2.4.1 Major Control Blocks
      2.4.1.1 Control Priority Encoder
      2.4.1.2 The Sequencer PLA (QPLA)
      2.4.1.3 The Decoder
    2.4.2 Control signals
    2.4.3 Status Flags
      2.4.3.1 INIT
      2.4.3.2 INCR UA
      2.4.3.3 FLTI
      2.4.3.4 FLTM
      2.4.3.5 CC0, CC1
      2.4.3.6 DNE
      2.4.3.7 FLOW ACTIVE
      2.4.3.8 PIRMT
      2.4.3.9 STKMT
      2.4.3.10 SAW
      2.4.3.11 LOOKAHEAD (LAH)
      2.4.3.12 DST
      2.4.3.13 TF
  2.5 Fault Control Logic
  2.6 Bus Interface Logic
    2.6.1 Valid Instruction Fetch Data (VIFD)
    2.6.2 Instruction Fetch Done (IFD)
    2.6.3 Done (DNE)
    2.6.4 Bus Error (BERR)
3.0 MIS Logical Mechanisms Description
  3.1 Sources of Microinstructions
  3.2 Microinstruction Lengths
  3.3 Faults
  3.4 Testing and Initialization
  3.5 S-CODE
  3.6 MIS Priority Controller
4.0 Typical Instruction Unit Operation

INTRODUCTORY DESCRIPTION OF THE INVENTION

The following introductory description broadly describes the various elements of the instruction unit in which the invention is embodied, and provides an introduction to some of the termonology used throughout the following specification. A data processing system of the type in which the present invention may be embodied is more fully described in the above-identified Stephen R. Colley et al patent. FIGS. 5 and 6 of the Colley et al patent illustrate how the instruction unit of the present invention is interconnected with the remainder of the data processing system. The instruction unit is one part of a two-part generalized data processor. The second part is an execution unit which communicates with the instruction unit over an interunit bus. The execution unit is more fully described in the Colley et al patent. The interface between the instruction unit/execution unit pair and the remainder of the data processing system is more fully described in the above-identified Daniel K. Jackson patent. For ease of understanding, the reference numerals used in the Colley et al patent to identify the various functional data blocks are utilized throughout the following specification to identify the same logic blocks.

Referring now to FIG. 1, the instruction unit is comprised of two processors: the instruction decoder (ID), 222, and the microinstruction sequencer (MIS) 224. These two processors interact with each other over a number of multiline buses and a number of control lines. The instruction unit interacts with two buses: the Address/Control/Data Bus (ACD bus) and the Interunit Bus.

The ACD bus (214) may carry address, control, or data during different times in the bus transaction. Although the ACD lines carry differerent types of information during a bus transaction, the bus interface logic (780) may determine the status of the bus lines by monitoring ISA and ISB. This bus is more fully described in the above-identified Daniel K. Jackson patent.

The interunit Bus is the communication link between the instruction unit and execution unit. The Interunit Bus carries microinstructions, data, and logical address information from the instruction unit to the execution unit. The Interunit Bus also carries status and fault information for the MIS, and bit pointer information for the ID. The Interunit Bus has two main components: the Microinstruction Bus (220) and the BP/F Bus (217). In addition, there is also a TRUE line (218) which returns condition code bits to the instruction unit from the execution unit, a FAULT line which signals that an instruction unit fault has been detected by the execution unit and a DONE line which signals the completion of a variable cycle microinstruction.

The Microinstruction Bus (220) is a unidirectional bus from the instruction unit to the execution unit. The bus is used to transfer microinstructions, data, and logical address data to the execution unit. Internally, the Microinstruction Bus can be sourced from several locations. Under normal operation, microinstructions are read from the microprogram ROM (226) under control of the MIS and transferred to the execution unit on the Microinstruction Bus. The ID, however, may also "steal" a cycle from the microprogram ROM and force a microinstruction across the Microinstruction Bus.

A single microinstruction issued by the instruction unit may cause a sequence of activities to occur on the execution unit. For example, a single microinstruction called ACCESS MEMORY causes the execution unit to generate a physical address, check access rights, issue a bus request, and carry out the transaction. In the case of these variable-cycle microinstructions, the execution unit returns a "done" signal to the instruction unit (on the DONE line) when the microinstruction completes.

There are many macroinstructions which may be entirely executed as they are being decoded by the ID. In these cases, the ID does not have to access the microprogram ROM at all; instead, the ID can force the microinstructions needed to execute the macroinstruction directly onto the Microinstruction Bus.

The Microinstruction Bus is also used to transfer data, segment selector, displacement, and branch address information from the ID to holding registers on the execution unit. The information to be transferred is stored in a two-deep FIFO (called EXBUF-308). This FIFO may be loaded with data of several different lengths. The data to be transferred is always right-justified and padded with leading zeros to 16 bits so that the execution unit gets 16 bits of valid data. In addition, relative branches references have their sign automatically extended to 16 bits before being transferred to the execution unit.

Microinstructions which involve transfer of this EXBUF data are multiple-cycle microinstructions. The microinstruction is transferred during the first cycle and the contents of the FIFO are transferred on subsequent cycles.

The BP/F lines (217) are unidirectional from the execution unit to the instruction unit. These lines are used to carry an encoding of a fault condition should a fault occur. The lines are also used to carry bit-pointer information to the ID in the case of a macroinstruction branch.

The execution unit detects many faults which cause special action on the instruction unit. In the case of a fault, the FAULT line from the execution unit is asserted and a fault encoding is transferred to the instruction unit on the BP/F lines. This fault encoding is used by the instruction unit to select the starting address of the correct fault microinstruction flow from the "fault" ROM (779). When a fault occurs, the microinstruction flow being executed is interrupted and the fault flow begins execution. When the fault flow finishes, execution of the interrupted flow may be resumed if possible.

The BP/F lines are also used for the execution of branches. The program counter for the instruction unit/execution unit pair is stored as two pieces; the double-byte pointer is stored on the execution unit and the bit pointer is stored on the instruction unit. In the case of a branch, the execution unit may have to do some calculations on the entire program counter. A mechanism has been provided for transferring bit-pointer information between the two units to allow this: the bit pointer may be transferred to the execution unit via the EXBUF FIFO and new bit-pointer information may be returned to the instruction unit on the BP/F lines. The instruction unit always assumes that the BP/F lines carry bit-pointer information unless the FAULT line is asserted. If FAULT is asserted, the information on the BP/F lines is interpreted as a fault encoding. BP/F is also used to transfer the four least significant bits of the top of the operand stack (maintained on the execution unit) to the bit pointer if the branch is through the top of stack.

The remaining lines in the Interunit bus are the TRUE line and the DONE line. The lines are unidirectional from the execution unit to the instruction unit and are used primarily to return status information to the instruction unit.

The TRUE line is used whenever a conditional branch in the microcode is performed. The microprogram performs the operation that it wishes to branch on and then requests that the proper condition flag be transferred to the instruction unit (on the TRUE line) where it is latched. The instruction unit then does the branch based on that condition.

The DONE line (219) is used to return a "done" signal to the instruction unit during some multiple-cycle microinstructions. The "done" signal informs the instruction unit that a multiple-cycle microinstruction is about to complete. The instruction unit detects that a multiple-cycle microinstruction is being transferred to the execution unit and loops on that microinstruction until the DONE line indicates that the execution unit is about to complete the microinstruction. While the instruction unit is looping on the multiple-cycle microinstruction, it is transferring No-Ops to the execution unit. When DONE indicates that the microinstruction is about to complete, the instruction unit continues. The "done" signal is actually sent out by the execution unit one-half cycle before it will complete the microinstruction. This is to allow the MIS pipeline to fill early so that there is no lost cycle before resumptiom.

The instruction decoder (222) receives the bytes of an instruction stream on the ACD bus (214). The ID interprets the fields of an instruction and generates the microinstructions, or starting addresses for longer microprogram routines, which are necessary for the execution unit to execute the instruction. The ID also formats logical address information, which is transferred to holding registers on the execution unit.

The microinstruction sequencer (224) receives microinstructions and starting addresses for microprogram routines from the ID. The MIS decodes the microinstructions and transfers them to the execution unit where they are executed.

Two first-in, first-out (FIFO) buffers are located between the MIS and ID. The EXBUF (308) buffers data received from the ID over the X-Bus (700). An EXBUF-full flag is associated with this buffer to indicate when the registers of the buffer are full. The PIR buffer (310) is provided to buffer forced microinstructions received over the P-bus (702) from the ID. A "PIR-full" flag is associated with this buffer to indicate when the registers of the buffer are full. In addition, a "PIR-empty" flag is provided to indicate whether the registers of this buffer are empty or not empty.

The ID sends the MIS forced microinstructions over the P-bus (702) and starting addresses for long microinstruction flows over the S-bus (708). The forced microinstructions are buffered in the PIR FIFO, which contains two registers, in the preferred embodiment of the present invention. The ID may load a forced microinstruction as long as the PIR-full line (704) is not energized.

When the instruction decoder has a starting address for a long instruction flow, it signals the MIS by asserting the starting address waiting (SAW) line (712) and stops. The microinstruction sequencer always services a forced microinstruction over a starting address which may be waiting. Therefore, provided the PIR-empty line is asserted, the MIS will service the starting address by loading the starting address into the microaddress register. The MIS will be assert the ready-to-accept starting address (RASA) line (714) and will assert the flow-active line (710). (If the PIR-empty line had been not asserted, the MIS would have serviced the priority microinstructions stored in the PIR FIFO before accepting the starting address.)

Upon recognition of the RASA line (714) being asserted, the ID will disassert the SAW line (712) and continue.

The instruction decoder is now free to go into lookahead mode and to fetch a new macroinstruction and start interpreting it while the MIS is sequencing through the microinstruction flow of the previous macroinstruction.

The look-ahead line (718) is asserted by the MIS when the MIS receives the starting address from the ID and initiates the microprogram flow. During the time that the look-ahead line is asserted, the ID is free to start decoding the next instruction, while the MIS is sequencing through the first instruction. The ID will never get more than one macroinstruction ahead of the MIS. The look-ahead line (718) is disasserted by the MIS at the end of the microinstruction flow as indicated by the MIS executing an "end-of-macro" or "end-of-branch-macro" microinstruction.

When the instruction decoder issues a forced microinstruction, the microinstruction is stored in the PIR. If the PIR-full line (704) is asserted at the time the ID attempts to load the microinstruction, the ID waits until the PIR-full line is disasserted, then loads the microinstruction, and advances to the next state. As long as a flow is being executed by the MIS, the MIS will not accept any microinstructions from the PIR. The ID may continue to decode the next instruction and load the PIR until it is full, but none of the microinstructions in the PIR will be executed, until the MIS completes the previous instruction. Since the PIR is a first-in, first-out register, the microinstructions stored therein will always be executed in the proper order, when the MIS allows them to be executed.

A macroinstruction is received on the ACD Bus (214) and stored in the instruction buffer (301). A macroinstruction is made up of a number of variable bit-length fields. Sixteen bits of the macroinstruction at one time are transferred to the extractor (765). A bit pointer (302) indicates the bit position in the macroinstruction of a particular field to be decoded. The initial value of the bit pointer is set externally over the B P/F bus (217). The bits of the particular field are stripped off by the extractor and presented to a state machine (305). The state machine includes logic for decoding the particular field and for generating data, forced microinstructions and starting addresses for microprogram routines over buses 700, 702, and 708, respectively. Once the decoding is complete, the state machine sends a shift count (303) equal to the number of bits in the particular field just decoded. The shift count is added to the bit pointer in an adder (772), with the sum replacing the bit pointer value. The new bit pointer value now points to the next field to be processed.

Data are transferred from the ID by utilizing the X-bus (700). Data are buffered in the EXBUF (308). The ID may load the EXBUF until it is full, but none of the data will be transferred over the Microinstruction Bus 220 until the MIS allows it to be transferred. This is accomplished by making all transfers out of the data buffer (308) through forced microinstructions stored in the microinstruction buffer (310). Since the MIS won't execute the forced microinstructions in register 310 until there is no flow active, the data in buffer 308 won't be transferred to the execution unit until the corresponding forced microinstruction stored in register 310 is executed. This mechanism prevents the ID from overwriting logical address information while it is still needed by the execution unit.

Transfers of starting addresses from the ID to the MIS are fully interlocked. The ID is controlled by the MIS whenever the ID generates a starting address over S-bus (708). The MIS will only accept a starting address from the ID if there is no flow active and the PIR (310) is empty. This ensures that everything is completed before a new microinstruction flow is initiated by the MIS. The ID is prevented from moving to a new state until the RASA line (714) is asserted by the MIS. Thus, whenever the ID has a starting address waiting and the MIS is not ready to accept it, the ID loops with the starting address waiting. Once the starting address has been taken, and RASA (714) has been asserted, the ID may begin decoding the next macroinstruction.

1.0 INSTRUCTION DECODER (ID) DESCRIPTION

1.1 General

Figure 2:
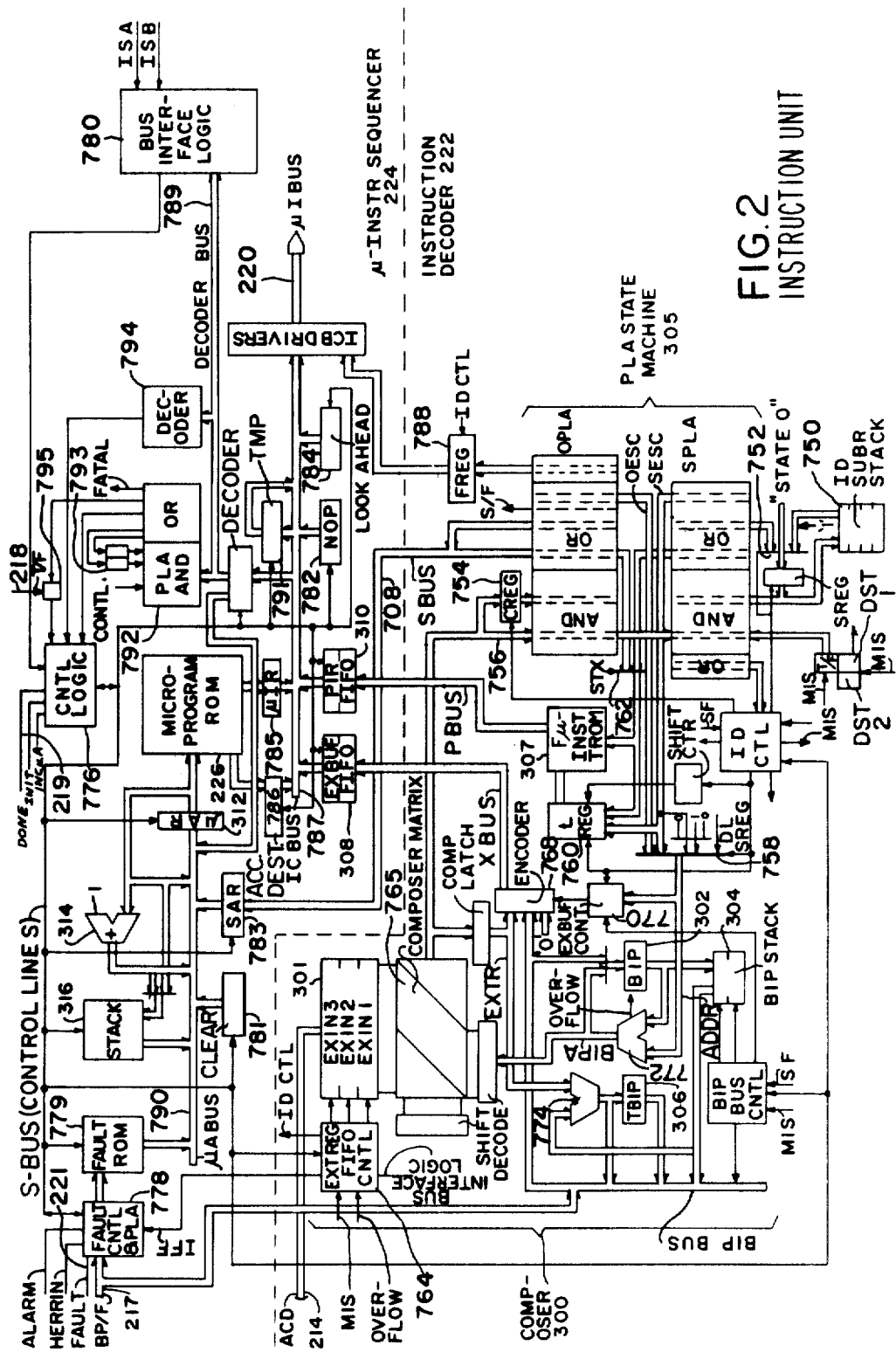
FIG. 2 is a more detailed block diagram of the instruction unit shown in FIG. 1.

Refer to FIG. 2. The ID is initialized (under microcode control) after reset and whenever a branch in the instruction flow is executed. This initial state forces an instruction fetch to occur, thus filling the ID with the first 32 bits of the instruction. In addition, initialization causes the ID state sequencer to interpret the field of the instruction as the class field.

The ID examines the class field, saves the lengths of the operands in a register, and stores the class field for later use with the opcode. It then updates the Extractor past the class field to the format field, where it branches to the proper decode sequence, based on the format.

If there are explicit references in the instruction, the ID processes the fields, saving logical address information and forcing the microinstructions necessary to fetch the operands.

Once the ID has fetched all of the operands (which are stored on the execution unit), it selects either the forced microinstruction (in the case of a simple operation) or the proper starting address for the microprogram flow (for more complicated operations) necessary to perform the operation specified by the class and opcode of the instruction. If the operation is a forced microinstruction, the ID next forces another microinstruction which causes the result of the operation to be stored followed by an "end-of-macroinstruction" indicator. The ID then branches back to its starting state where it begins decoding the next instruction. If the operation calls for a starting address, the ID transfers the starting address to the MIS and branches back to its starting state so that it may begin decoding the next instruction.

When the ID issues a forced microinstruction, the microinstruction is saved in the two-deep FIFO, PIR (310). The MIS checks PIR and, if there is a microinstruction waiting, decodes it and transfers it to the execution unit. If the PIR FIFO is full when the ID attempts to load a forced microinstruction, the ID waits until PIR is not full, loads the microinstruction, and advances to the next state.

Logical address information is stored in the two-deep FIFO, EXBUF (308). Before the information is loaded into EXBUF, it is padded with zeros to 16 bits (logical address information is of variable bit-length) so that the execution unit always receives 16 bits of valid data. In the case of branch references, the target address is formatted in a form which makes the target address calculations simple for the execution unit. The EXBUF FIFO contents may be transferred to the execution unit under microcode control. As with PIR, if the EXBUF FIFO is full when the ID attempts to load it, the ID waits until it is not full, loads EXBUF, and advances to the next state.

Although macroinstructions may be hundreds of bits long, the ID contains, at most, 32 bits of the macroinstruction at any one time. When the ID processes the first 16 bits of the 32 stored, it reloads the Extractor with the next 16 bits of the macroinstruction. As a result, the Extractor always contains at least 16 contiguous bits of valid data. The ID is stopped during this reload and only continues once the reload has been completed.

If the ID only stored 32 bits of the macroinstruction at a time, it would have to issue an instruction fetch every time it processed 16 bits of the stream. Since instruction fetches incur a lot of overhead, the ID would spend a majority of its time waiting for instruction stream data. To minimize this effect, the ID contains an additional 16-bit buffer register. An instruction fetch always fetches 32 bits of the instruction stream. Half of the bits go directly to the Extractor and half of them are stored in this buffer register. After the ID processes the first 16 bits in the Extractor, the buffer contents are transferred to the Extractor and no instruction fetch is issued. This results in only a one-cycle delay. Once the next 16 bits of the Extractor have been procssed, the ID issues another instruction fetch and waits until the valid data is returned from memory.

It would be highly inefficient for the ID to issue a fetch for more data if an entire branch instruction were contained in the Extractor. Yet this is possible because the ID issues the fetch after it crosses the first 16-bit boundary. If the remainder of the instruction fits in the upper 16 bits of the Extractor, the fetch is wasted. To prevent this, the ID may inhibit fetches once it has determined that the Extractor contains the entire instruction. If, at the end of the branch, the branch is taken, the Extractor must be reloaded anyway. If the branch is not taken and the Extractor is not full, the ID must issue a fetch before it can continue.

It is desirable to handle branching in as efficient a manner as possible. This is done by performing the majority of the necessary branch activity on the instruction unit chip. The ID contains provisions for calculating the proper bit pointer for the branch target and transferring it to the bit pointer register (BIP). As a result, target address information does not have to be transferred from the execution unit to the instruction unit chip.

1.2.1 The PLA Logic

The PLA stage-machine logic (305) is responsible for sequencing the ID through the fields of an instruction and for generating the forced microinstructions and starting addresses necessary to execute the instruction. It is composed of several parts: the SPLA and SREG logic; the OPLA; the ESC Mux; the LREG; and the TROM Mux and TROM. The PLA logic receives the rightjustified fields of the instruction, as well as some control information from the MIS, and generates forced microinstructions and microprogram starting addresses for the MIS. In addition, the PLA logic also generates the bit pointer update information for use in the BIP Bus logic. The PLA logic also includes the ID CTL logic which generates most of the control signals for the ID.

1.2.1.1 SPLA and SREG Logic

The SPLA and SREG logic control the actual sequencing of the ID. The SREG contains a state value which specifies the field that the ID is currently decoding. For example, one state value may indicate that the ID is examining the class field of the instruction. The SREG may be loaded from several sources. Normally, the SPLA determines the next state of the SREG, based on the current contents of the SREG and the value of the field being decoded from the Extractor. But, under certain conditions, the SREG can either be loaded with the top element of the ID subroutine stack (750) or it can be loaded with a constant "state 0." "State 0" is the ID's initial state.

Since instruction decoding is highly modular, the SREG may be loaded from the ID subroutine stack, 750. A return state may be pushed on this stack under SPLA control, and a branch made to the subroutine flow. When the flow is completed, the SREG receives the return state from the subroutine stack. The SREG may also receive state ∅ from the SREG Mux, 752. State ∅ is the initial state of the ID and is entered every time the ID starts decoding a new instruction.

"State ∅" may be loaded into the SREG in several ways. At reset, for example, the ID is initialized and the SREG is loaded with "state ∅." When the ID receives a start ID command from the MIS, it starts decoding the macroinstruction from the beginning. "State ∅" may also be forced by the MIS. The MIS may issue a microinstruction which resets the ID to its initial state. This reset ID microinstruction clears the ID and has the same effect as a hardware reset. It is this restart mechanism which allows the ID to recover after a branch in the macroinstruction flow. Once the branch is detected by the MIS, the ID is reset under microcode control and the new instruction pointer set up. When the ID is restarted (also under microcode control), it will start decoding the instruction at the new address. "State ∅" is also entered whenever the ID completes decoding one instruction and starts the next.

The operation of the ID is actually controlled by the loading of SREG. For example, whenever the ID Extractor is not ready (waiting for data), SREG is not loaded with any new value. Instead, the old state (and old Extractor contents) are used again. This holds the ID at the same state. Once the Extractor is ready, the new state is loaded, the Extractor is updated, and the ID advances to the next state.

A similar method is provided for forced microinstructions, EXBUF operations, and starting addresses. PIR (308) and EXBUF (310) are two-deep FIFOs which are accessed by the MIS. Since the ID and MIS operate asynchronously with respect to each other, there must be some way to communicate between them. Each FIFO has a full flag associated with it. This full flag is controlled by the MIS. If the ID attempts to load either PIR or EXBUF when its associated flag is full, the load is aborted and the SREG is not loaded with a new state. As a result, the ID holds until the MIS changes the status of the affected full flag. Once the full indication is removed, the ID proceeds.

When the MIS accepts a starting address from the ID, it goes into look-ahead mode. Essentially, this means that the ID is decoding the next macroinstruction while the MIS is executing the current macroinstruction. Since the two are out of sync, care is taken to ensure that everything is executed in the proper order.

In addition to starting addresses from the ID, the MIS may also receive starting addresses for fault routines over BP/F line (217) if the execution unit has detected a fault. Whenever the MIS is executing a starting address flow from the ID, or a fault flow from the fault logic, a flow active flag is set. As long as a flow is being executed by the MIS, it will not accept any forced microinstructions from PIR (310). The ID may continue to decode the next instruction and load PIR until PIR is full, but none of the forced microinstructions in PIR will be executed. Since the PIR is a FIFO, the forced microinstructions will always be executed in the proper order, but only when the MIS allows them to be executed.

A similar mechanism is available for EXBUF operations. The ID may load EXBUF (308) until it is full, but none of the data will be transferred to the execution until until the MIS allows it. This is done by linking all EXBUF transfers by the ID to forced microinstructions. Since the MIS won't execute the forced microinstructions until there is no flow active, the data won't be transferred to the execution unit until the forced microinstruction is executed. This prevents the ID from overwriting logical address information while it is still needed by the execution unit.

ID-generating starting addresses are also handled carefully. While it is all right for the ID to get one complete macroinstruction ahead of the MIS, it would be dangerous for it to get more than one instruction ahead. For example, how would the MIS know which forced microinstructions went with which instruction. The ID contains a two-deep stack (304) which contains starting bit pointers for the instruction being decoded and the one being executed. This stack is pushed whenever the ID begins decoding a new instruction. If the ID were allowed to start on a third instruction, some of the data would be lost and it would be very difficult to recover from a fault, should one occur. The ID is controlled by the MIS whenever the ID generates a starting address. The MIS will only accept a starting address from the ID if there is no flow active and the PIR is empty. This ensures that everything is completed before a new flow is initiated. SREG is prevented from changing whenever the ID has a starting address waiting and the MIS is not ready to accept it. As a result, the ID loops with the starting address waiting until the MIS accepts the starting address. After the starting address has been taken, the SREG is released and the ID begins decoding the next instruction.

1.2.1.2 OPLA Logic

The OPLA contains the starting address or forced microinstruction necessary to execute each macroinstruction in the GDP macroinstruction set. The OPLA is only accessed once per instruction when the ID is processing the opcode field of the instruction it is decoding. The class field of the instruction being decoded is stored in the CREG (754), and in conjunction with the rightjustified bits (756) of the opcode from the Extractor, is used to select the proper starting address or forced microinstruction for the operation. There is a bit in the OPLA which specifies to the ID CTL whether the line is a forced microinstruction or a starting address. This bit is used to control the SREG and to put either the starting address on the SBUS, or the forced microinstruction (through the TROM, 307) onto the PBUS, to the MIS. If the OPLA line is a forced microinstruction, the ID continues to sequence through the SPLA, forcing the store of the result, and the end of operation before beginning to decode the next instruction. If the OPLA line is a starting address, the ID waits until the starting address is accepted by the MIS and then branches back to "state ∅" so that it can begin decode of the next instruction.

The OPLA also contains an 8-bit code for each operation in the instruction set. This code is loaded into the FREG whenever the OPLA is accessed. The FREG may be transferred to the Execution unit under microcode control and may be used to give an indication of the macroinstruction that faulted, f a fault has occurred.

1.2.1.3 The ESC Multiplexer

Both the SPLA and OPLA generate update information (OESC and SESC) for the Extractor. The SPLA produces the update information during all cycles except the one which accesses the OPLA. When the OPLA is accessed, it provides the update information. The update information from both PLAs is multiplexed together by the ESC (Extractor Shift Control) Mux (758) and transferred to the BIP Bus logic where it is used to update the Extractor past the field that has just been decoded. In addition, the ESC Mux may force either a 4 or a 6 to the BIP Bus. When the ID saves the lengths of the operands while decoding the class, it must use some of the extractor update bits from the SPLA to encode the lengths. Since class fields can only be 4 or 6 bits wide, the ID can specify the update information in one bit instead of several. It is at this time that either 4 or 6 is forced from the ESC Mux.

1.2.1.4 The LREG

Whenever the ID is decoding the class field of an instruction, it must save the information specifying the lengths of the operands until the operands are fetched. This information is saved in the LREG (760), which is a 3-bit wide by 3-deep FIFO. The length of the operands are coded into three 3-bit codes, one for each operand. This 9-bit field is parallel loaded into the LREG FIFO as the ID passes over the class field of the instruction. When the ID issues a forced microinstruction to fetch an operand, it injects the top entry in LREG into the operand length field of the fetch operand microinstruction. The FIFO is then popped so that the length of the next operand is available when the ID is ready to fetch that operand.

1.2.1.5 TROM and TROM Multiplexer

Both the SPLA and the OPLA may issue forced microinstructions. The SPLA issues all of the forced microinstructions used in decoding the instruction, and the OPLA issues the forced microinstruction which actually performs the operation, if the operation to be performed can be handled with a single microinstruction. To minimize the size of the SPLA and OPLA, a translation ROM (307) is actually used to generate the forced microinstruction. The PLAs generate a 6-bit code which is translated into a 16-bit microinstruction by the TROM. For most cases, the TROM produces the entire microinstruction; but for forced microinstructions which need a length field, the TROM generates 13 bits of the forced microinstruction and the LREG provides the other three.

Arithmetic operations may be either signed or unsigned. At the time the LREG is loaded, this signed information is not known. As a result, one of the bits of the OPLA is used to modify the output of the LREG before it becomes part of the forced microinstruction. The effect of this is to allow the same microinstruction to be either signed or unsigned; depending upon the operation that is to be performed.

The TROM Mux (762) simply multiplexes the 6-bit forced microinstruction codes from the two PLAs. Forced microinstructions are transferred to PIR on the PBUS.

1.2.2 The Extractor Logic

The Extractor logic is responsible for presenting the right-justified fields of the instruction to the PLA logic. In addition, the Extractor formats logical address information before it is stored in EXBUF (308). The Extractor logic contains the logic necessary to request instruction fetches and accept the instruction data from memory. The Extractor logic is composed of three major blocks: the composer matrix (765) and Extractor register FIFO (301); the Extractor register control logic (764); and the EXBUF encoder (768) and encoder control (770).

1.2.2.1 Composer Matrix and Extractor Register FIFO

The operation of the Extractor is made possible by a composer matrix (765). A composer matrix is an array of MOS devices which can display any 16 continguous bits of data (out of 32 inputs) on its output lines. The starting position of the 16 bits is selected by a pair of 4-to-16 shift decoders which feed the shift lines of the matrix. In the ID these decoders are fed by a bit pointer which is controlled by the BIP Bus logic. This bit pointer gives the starting position of the field that is being decoded by the ID. When the ID completes processing of a field, the bit pointer is advanced to the starting position of the next field. This has the effect of shifting the composer matrix to the beginning of the next field, thus displaying the next 16 bits of the instruction, starting with the beginning of the new field.

The composer matrix is fed by a 3-deep by 16-bit wide FIFO (301). The first two words of the FIFO serve as input to the composer matrix and the third word acts as an instruction buffer. When the ID processes 16 bits of extractor data, the FIFO is pushed. This transfers the second register to the first and the third (if full) to the second. As a result, the composer matrix always outputs 16 bits of valid data. The registers in the FIFO can get data either from memory (on the ACD lines, 214) or from one of the other registers in the FIFO.

Each of the three registers in the FIFO has a full bit associated with it. These full bits are used by the extractor register FIFO control logic (764) to route the data in the FIFO to the correct place. The full bits are also used by the control logic to determine that an instruction fetch request should be issued.

1.2.2.2 The Extractor Register FIFO Control Logic

The extractor register FIFO control logic (764) may be broken into two parts. Part of the logic controls the extractor register FIFO and part of it controls SREG loading. The extractor register FIFO algorithm is:

1. When data from memory is loaded into the FIFO, it is always routed to the lowest empty register.

2. Every time the ID processes 16 bits of extractor data, the data in the FIFO is moved. Register two always gets transferred to register one. If register three is full, it gets transferred to register two and no instruction fetch is issued. If register three is empty, register two remains unchanged, but is marked empty. In addition, an instruction fetch request is issued, if instruction fetches aren't inhibited by the ID.

3. A register is marked full whenever it contains valid data, and empty whenver its data is moved to a new register and is not replaced with new data.

Whenever the ID is initialized (either hardware reset or under microcode control), all of the extractor registers in the FIFO are marked empty. When data from the first instruction fetch is returned, it goes into registers one and two. After the ID processes the first 16 bits of data, register two is transferred to register one and an instruction fetch request is issued (because register three is empty). Data from this fetch is loaded into registers two and three. Thereafter, register three is transferred to register two and register two is transferred to register one when the first 16 bits are processed. After the next 16 bits are processed, register two goes to register one and an instruction fetch is issued. Data from the fetch is loaded into registers two and three. This procedure is repeated until the ID is reinitialized.

The extractor register control logic inhibits the loading of SREG through the extractor ready signal. SREG will only be loaded with the next state if the extractor is ready. The control logic receives an overflow indication from the BIP Bus whenever the ID completes the processing of 16 bits. This overflow signal is used by the control logic to set the Extractor not ready and initiate a data transfer in the Extractor register FIFO. If no instruction fetch is requested, the data in the FIFO is moved and the Extractor is marked ready again. If an instruction fetch is requested, the Extractor remains not ready until the instruction fetch is completed. Once the fetch is completed, the Extractor is marked ready and the ID may continue; as long as some other condition doesn't prevent it (PIR full, for example).

Special provisions have been included in the Extractor register control to increase the efficiency of branches. By the time the ID is processing the branch reference of a branch instruction, the maximum length of the instruction is known. A check is performed by the control logic. If the remainder of the instruction is contained in the Extractor, instruction fetches are inhibited. This prevents an instruction fetch for data that will not be used because the branch occurs. If the Extractor control receives an overflow, the data in the FIFO is still moved, but no instruction fetch occurs. This could create a problem because it leaves the ID running with less than 16 bits of valid data in the Extractor.

If the branch is taken, there is no problem because the instruction fetches are only inhibited if the Extractor contains the entire branch instruction. Once the ID has completed the decode of a branch instruction, in which the branch will be taken, it is stopped until the MIS loads the target instruction and restarts the ID.

If the Extractor does not have 16 bits of valid data and the branch is not taken (conditional branches only), there is a problem. When the ID begins decoding the instruction after the branch, it may decode invalid data if it needs any of the data in the second extractor register (since this register is empty). To prevent this, a check is made on register two when the decision not to branch is made. Instruction fetches are uninhibited at that time. If register two is empty, the Extractor is marked not ready and an instruction fetch request is issued.

1.2.2.3 EXBUF Encoder and Control

Although the Extractor always presents 16 bits of valid data to the ID, logical address information may not be 16 bits long. The EXBUF encoder (768) is used to format data before it is transferred to the execution unit through the EXBUF FIFO (308). For logical address information, the formatting required is to simply pad the logical address information with zeros to 16 bits. This way the execution unit is guaranteed to receive 16 bits of valid logical address information.

The instruction unit also calculates the target address for branches. This data must be transferred to the execution unit so that it can update its instruction pointer and fetch the target instruction. This branch target address information is formatted by the EXBUF encoder to a form which simplifies the address calculation required on the execution unit.

The EXBUF encoder may also transfer the contents of the BIP Bus to the execution unit through EXBUF FIFO (308). This data is used for fault recovery. In this case, the BIP Bus data is padded with zeros to 16 bits.

The EXBUF encoder is simply a multiplexer which is controlled by the encoder control. The encoder control receives length of field information as well as some control information from the PLA logic. It also receives control information from the BIP Bus logic. This information is used to select the proper paths for the data through the EXBUF encoder.

1.2.3 BIP Bus Logic

The BIP Bus logic produces the current bit pointer for the Extractor. In addition, the BIP Bus logic calculates the bit pointer portion of the branch target address. This target address may then be loaded into the bit pointer, completing the instruction unit portion of the branch. The BIP Bus logic also contains several registers which hold starting bit pointer address information which may be transferred to the execution unit under microcode control.

The BIP Bus logic is composed of three major blocks: the bit pointer update logic; the TBIP logic; and the BIP stack (304).

1.2.3.1 The Bit Pointer Update Logic

The bit pointer update logic receives bit pointer update information from the PLA logic and generates a current bit pointer for use by the Extractor. The update information from the PLA logic is added to a BIP register (302) which contains the previous bit pointer and the output of this BIP adder (772) is sent to the composer matrix (765) as the current bit pointer.

Every time the bit pointer update logic detects that the Extractor has crossed a 16-bit boundary, it notifies the Extractor. This is accomplished by transferring the carryout from the BIP adder to the Extractor. Whenever the ID crosses a 16-bit boundary, the BIP adder wraps around. Since the Extractor registers are also 16 bits long, the wrapped-around bit pointer is still correct, but it now points to the second word in the Extractor. When the Extractor receives the overflow indication (at the same time the bit pointer wraps around), an Extractor register FIFO update is initiated. This brings the second word of the Extractor (301) to the first. Since the bit pointer is correct, the ID may proceed as soon as the Extractor goes ready again.

The BIP may be loaded from several sources. During normal operation, the BIP receives the output of the BIP adder whenever the ID advances to the next state. If the ID is stopped for some reason, the BIP is not updated. As a result, the Extractor points to the same field and the ID loops until it is allowed to proceed (since SREG loading is also inhibited).

The BIP (302) may also be loaded with the contents of the BP/F lines (217) from the execution unit. It is through this mechanism that the ID may be initialized to any point in the macroinstruction stream. In the case of a simple branch, however, the new bit pointer is calculated on the instruction unit and just transferred to the BIP. This eliminates the need for any execution unit intervention.

1.2.3.2 The TBIP Logic

The TBIP logic generates the target bit pointer information for branches. The TBIP logic handles both absolute and relative branch addresses. For the case of an absolute branch, the bit displacement from the target branch address is transferred from the Extractor to the TBIP (Target Bit Pointer) register (360). The remainder of the target branch address is formatted by the EXBUF encoder and transferred to the execution unit through EXBUF FIFO (308).

Relative branch target address generation operates as follows. The relative branch target address from the Extractor is added by adder (774) to the value of the bit pointer at the beginning of the branch instruction. This beginning bit pointer is stored on the BIP stack (304). When the add is completed, the bit displacement of the target address stored in the TBIP (306) and the remainder of the target address is formatted by the EXBUF encoder (768) and transferred to the execution unit. The execution unit uses this target address to generate the new instruction pointer.

The TBIP register (306) may be loaded into the BIP (302) under microcode control. When a branch is taken, the MIS stops the ID and marks the extractor registers empty. The TBIP is then transferred to the BIP. When the ID is started, it sees that the extractor registers are empty and initiates an instruction fetch. Since the execution unit has the target address in its instruction pointer, the first 32 bits of the target instruction are loaded into the Extractor. The ID can then begin decoding the target instruction.

1.2.3.3 The BIP Stack

The BIP stack (304) is used to save starting bit pointer values for the instruction currently being decoded and the one being executed. To assist in fault recovery, this information may be transferred to the execution unit under microcode control. In addition, the BIP Stack elements may also be loaded into the BIP. This BIP load capability enables the ID to re-decode an instruction.

The BIP stack (304) is pushed whenever the ID begins decoding a new instruction. If the MIS is in look-ahead mode, the top element of the BIP stack contains the starting bit pointer for the instruction currently being decoded by the ID and the second element of the BIP stack contains the starting bit pointer for the instruction currently being executed by the MIS. If either instruction faults, the elements of the BIP stack may be transferred to the BIP or the execution unit. If the ID is not in look-ahead mode, the top element of the BIP stack contains the starting bit pointer of the instruction being decoded. The top element of the BIP stack is also used by the TBIP for relative branch target address calculation, since it is the element which contains the starting bit pointer for the beginning of the branch instruction.

2.0 MICROINSTRUCTION SEQUENCER (MIS) DESCRIPTION

There are three major buses in the MIS: (1) the interchip bus (ICB), (2) the decoder bus (DB), and (3) the microaddress bus (MAB). There are also three major sections of control circuitry: (1) MIS control logic (776), (2) fault control logic (778), and (3) interface control logic (780). These three buses and three sections of control circuitry logically divide the MIS into six major blocks of hardware. Each block is discussed individually in the following sections 2.1 through 2.6.

2.1 The Interchip Bus (ICB)

The ICB is a 16-bit precharged bus used to receive microinstructions and occasionally data to be sent to the execution unit. Sources of microinstructions are: (1) PIR FIFO (310), (2) microprogram ROM (226), (3) TMP stack, and (4) a ROM (782, 784, 786) which holds four constant instructions. Sources of data to the ICB are: (1) XBUF FIFO (308), and (2) FREG. The MIS control logic determines which of the above sources goes onto the ICB and thence out to the execution unit via the microinstruction bus (MIB).

2.1.1 PIR FIFO

The PIR FIFO (310) is a two-deep FIFO which buffers forced microinstructions. It is loaded by the instruction decoder from the TROM (307) and put on the ICB by the MIS control logic (776). Two flags are associated with the PIR FIFO: (1) PIR FULL and (2) PIR EMPTY. PIR FULL is used by the instruction decoder to control loading of the PIR FIFO. PIR FULL inhibits the instruction decoder from loading to the PIR FIFO when a forced microinstruction is ready to be queued. PIR EMPTY, when not asserted, indicates the presence of a forced microinstruction waiting in the PIR FIFO. The PIR FIFO is cleared (1) by INIT, (2) when the ID is stopped.

2.1.2 Microprogram ROM

The microprogram ROM (226) is a 3.5K by 16-bit ROM containing microinstruction flows for various macroinstructions and fault routines. It is output to the ICB under control of the MIS control logic. There is no clocked latch between the ROM and the ICB, only output drivers and pulldowns to the bus. However, the output of the ROM is referred to as the microinstruction register (MIR).

2.1.3 TMP Stack

The temporary stack (TMP) is a two-deep stack used to store restartable access-memory microinstructions. When an access-memory microinstruction faults, the MIS control logic pushes the access-memory microinstruction from the decoder bus onto the TMP stack. A restart current access microinstruction can be executed which will cause the microinstruction on the top of the TMP stack to be popped onto the ICB and on out microinstruction bus.

2.1.4 Constant Microinstruction ROM

Six microinstructions are needed to be on hand for the MIS control logic to send to the execution unit. The first and most common is the NOP (782) which is sent during idle, wait, and pipefilling conditions. Secondly, there is set-lookahead (784) which is sent at the initialization of a microinstruction ROM flow sequence. The third and fourth (786) are access-memory and access stack, which are sent as a result of the access-destination microinstruction. All constant microinstructions are controlled by the MIS control logic. The fifth, instruction segment read, is sent by request of the ID when its extractor is empty. The last microinstruction, reset execution unit fault state, is sent at the beginning of all fault service routines.

2.1.5 XBUF FIFO

The XBUF FIFO (308) buffers data obtained fom the macroinstruction stream as a result of decoding macroinstructions. This data is often segment selectors, displacements, immediates, or branch references. The XBUF FIFO is loaded by the instruction decoder in much the same way as the PIR FIFO is loaded. There is an analogous XBUF FULL flag provided to the instruction decoder to control the loading of the XBUF FIFO. The XBUF FIFO is cleared (1) by INIT, (2) during an unsuccessful conditional branch (CINH), and (3) when the ID is started.

2.1.6 FREG

The FREG (788) contains an eight-bit fault encoding which uniquely identifies the last macroinstruction executed. The FREG is transferred onto the ICB during the third cycle of the execution of the transfer-operator-fault-encoding microinstruction.

2.1.7 The Decoder Register

The decoder register latches and saves all microinstructions which need to be decoded by the MIS control logic. This includes everything which goes across the ICB except: (1) data (XBUF, FREG, etc.), and (2) NOPs sent by the MIS control logic while executing multiple-cycle microinstructions. The decoder register outputs to the decoder bus.

2.2 The Decoder Bus (DB)

The decoder bus is a 16-bit bus driven from the output of the decoder register. It outputs to four places: (1) TMP stack, (2) microaddress bus (790), (3) QPLA (792), and (4) decoder (794). The purpose of the decoder bus is to transmit the microinstruction which is presently being executed to the appropriate control logic. The TMP stack and the decoder register have already been discussed. The decoder and the QPLA will be discussed in connection with the MIS control logic in section 2.4.

2.3 Microaddress Bus (MAB)

The MAB is a 12-bit precharged bus whose purpose is to transfer microinstruction ROM address (microaddresses) to the microinstruction address register (MAR-312). Sources of microaddresses are (1) the starting address register (783), (2) the incrementer (314), (3) the microaddress stack (316), (4) the FROM (779), and (5) constant microaddresses (781). These individual blocks will be discussed in the following sections.

2.3.1 Microaddress Register (MAR)

The microaddress register (312) drives the address inputs to the microprogram ROM (226). The microaddress register is controlled by the MIS control logic (776) and can receive data from the microaddress bus or it can remain unchanged during several cycles as in the case of waiting during a multiple-cycle microinstruction.

2.3.2 The Starting Address Register (SAR)

The SAR (783) is the name given to the outputs of the OPLA which provide starting addresses for ROM flow sequences. The SAR is to the OPLA much like the MIR is to the microinstruction ROM. It is implemented simply as pulldowns on the microaddress bus. Transfer of the SAR onto the microaddress bus is directed by the MIS control logic.

2.3.3 The Incrementer (INC)

The incrementer (314) computes a 12-bit MAR+1. It is transferred onto the microaddress bus and thence to the microaddress register to access the next microinstruction in the microprogram ROM during a ROM flow. The incrementer is transferred to the microaddress bus under direction of the MIS control logic.

2.3.4 The Microaddress Stack

The microaddress stack (316) saves return microaddresses during microsubroutines. The stack can push data from two sources: (1) the microaddress register (312), and (2) the incrementer (314). The incrementer is pushed when a branch-subroutine microinstruction is decoded. The microaddress register is pushed at the beginning of a fault routine if the MIS was in a ROM flow sequence. The microaddress stack outputs to the microaddress bus under control of the MIS control logic. The stack is cleared (1) by INIT, and (2) when end-of-macro microinstruction is executed.

2.3.5 Fault ROM (FROM)

The FROM (779) is a 13×12-bit ROM containing starting addresses for fault flows. To initiate a fault sequence the MIS control logic forces the appropriate starting address from the FROM onto the microaddress bus and hence into the microaddress register. The fault control logic determines which is the appropriate starting address and communicates that information directly to the FROM.

2.3.6 Constant Microaddresses

The MIS issues one constant starting address (781) and that is CLEAR. (It is noted that the FROM also contains constant addresses, but it is useful to keep the FROM separate from CLEAR because of the differences in the way they are controlled.) CLEAR is the starting address forced during an INIT. It is address ∅.

2.4 MIS Control Logic

In this section, the function or purpose of the major control blocks will be defined as well as the meanings of the major flags and signals available.

2.4.1 Major Control Blocks

Three major circuits are available to make the decisions necessary to control the MIS. First is the control priority encoder (776) which has the last say about what the MIS will do. Secondly, there is the sequencer PLA (QPLA-792) which makes decisions based on the current decoded microinstruction. Last, the decoder (794) creates control signals needed to execute instruction unit control microinstructions.

2.4.1.1 Control Priority Encoder

The control priority encoder (776) monitors all of the major flags and signals which affect the status of the MIS. Based on a priority scheme which will be discussed later on, the priority encoder controls what goes on to and off of the three major buses in the MIS.

2.4.1.2 The Sequencer PLA (QPLA)

The QPLA (792) monitors the decoder bus and basically is responsible for the execution of multicycle microinstructions. It asserts the necessary control signals to the MIS function blocks and provides the timing and necessary status signals to the control priority encoder to see that multiple-cycle microinstructions are properly executed.

2.4.1.3 The Decoder

The decoder (794) decodes single-cycle instruction unit control microinstructions and provides the control signals necessary to execute them. The following table lists the microinstructions and control signals handled by the decoder.

| MICROINSTRUCTION-GENERATED CONTROL SIGNALS FROM DECODER | |
|---|---|
| Function | Signal Name |
| STOP ID | STOP |
| START ID | START |
| POP BIP STACK | POPBSTK |
| MOVE TBIP TO BIP | TBP2BB |
| MOVE BIP TO XBUF | BSTK2XB |
| SET INVALID CLASS | SIC |
| SET PROCESSOR FATAL | SPF |
| MOVE COND TO BRANCH | COND2BF |
| RESET PROCESSOR | RSTPRO |
| TRANS DEQ TO BIP | BPF2BB |
| CLEAR FAULTS | CLRFLT |
| RESET IP AND STACK | RESIP |
| TRACE | TRACE |
| FUDGE TO XBUF | FUDGE |

2.4.2 Control Signals

The MIS generates several control signals as a result of executing microinstructions. The following table summarizes these signals.

| Control Signal | Responsible Microinstruction | Source |
|---|---|---|
| BPF-BB | Transfer DEQ to BIP | Decoder |
| TBP-BB | Move TBIP to BIP | Decoder |
| RESIP | Reset current access microinstruction | Decoder |
| BSTK-XB | Move BIP to XBUF | Decoder |
| POPBSTK | Pop BIP stack | Decoder |
| STOP | Stop ID, Start ID | Decoder |
| INVC | Stop ID | Decoder |
| SIC | Set invalid class fault | Decoder |
| TRACE | Set trace fault | Decoder |
| START | START ID | Decoder |
| SPF | Set processor fatal | Decoder |
| RSTPRO | Reset processor | Decoder |
| COND-BF | Move condition to branch flag | Decoder |
| DB-TMP | Access memory group* | QPLA |
| ISR | Instruction segment read | QPLA |
| ACM | Access Memory Group* | QPLA |
| PFMOP | Perform Operation | QPLA |
| EM | End of macro | QPLA |
| EBM | End of branch macro | QPLA |
| FREG CNTL | Transfer operator fault encoding | QPLA |
| INC-STK | Call microsubroutine | QPLA |
| RETFLAG | Return T/F flag | QPLA |
| VLMI | Access memory Group*, Perform operation | QPLA |
| EMSF, EMRF | End macro | QPLA |
| EBMSF, EBMRF | End branch macro, Return | QPLA |
| RTNRF | Return from microsubroutine | QPLA |

*Access Memory Group:
 Access memory
 Local access
 Access list access
 Instruction segment read
 Operand stack access

2.4.3 Status Flags

In the following sections the purpose, source, and meaning of the several flags used by the MIS control logic (776) will be discussed.

2.4.3.1 INIT

INIT is a pin which is asserted to reset everything and begin an initialization ROM sequence.

2.4.3.2 INCR MA

INCR MA is a test pin which is asserted to sequentially output (dump) the contents of the microprogram ROM out onto the MI pins.

2.4.3.3 FLTI

FLTI (fault immediate) is asserted by the fault control logic when an immediate fault is pending.

2.4.3.4 FLTM

FLTM (fault macro) is asserted by the fault control logic when a fault on end of macro is pending.

2.4.3.5

CC0 and CC1 (793) together give status information about multiple-cycle microinstructions. They are output from the QPLA (792) and input to the QPLA and control priority encoder (776). The following table summarizes the information they provide.

| Meaning and Use of CC Bits | | |
|---|---|---|
| CC1 | CC0 | Meaning |
| 1 | 1 | ready to go on to next microinstruction |
| 1 | 0 | ready to go on to next microinstruction, disable immediate faults |
| 0 | 1 | second cycle done, more to come |
| 0 | 0 | first cycle done, more to come |

Typical Flows
One-cycle microinstruction: 11
Two-cycle microinstruction: 00 (first cycle); 11 (second cycle)
Three-cycle microinstruction: 00 (first cycle); 01 (second cycle); 11 (third cycle)
Branch microinstruction: 11 (branch); 10 (microinstruction immediately following branch)

2.4.3.6 DNE

DNE (Done) is disasserted while executing a variable-length microinstruction. It remains disasserted or "not done" until the last cycle of the variable-length microinstruction as signaled by either the DONE pin or WLC (Waiting for Last Cycle) "anded" with ISB. DNE is forced high in the case of an INIT, INCRMA or HERR.

2.4.3.7 XTRMT

XTRMT (eXTRactor eMpTy) is asserted by the ID when it needs more instruction data. The MIS Control Circuitry will send an "Instruction Segment Read" microinstruction in response to XTRMT. The ID disasserts XTRMT when the instruction data is received.

2.4.3.8 FLOW ACTIVE

FLOW ACTIVE is a flip-flop which is set anytime a ROM flow sequence begins (INIT, faults, SAW) and is reset by the end-of-macro and end-of-branch-macro microinstructions except when a fault macro is serviced.

2.4.3.9 PIRMT

PIRMT (PIR empty), 706 FIG. 1, is asserted by the PIR control logic when there are no forced microinstructions waiting in the PIR FIFO to be executed.

2.4.3.10 STKMT

STKMT (microaddress stack empty) is asserted when there are no return microaddresses in the microaddress stack (316). It is used by the MIS control logic when returning from microsubroutines.

2.4.3.11 SAW

SAW (starting address waiting), 712, FIG. 1, is asserted by the instruction decoder when a starting address for a microinstruction ROM sequence is waiting to be transferred from the OPLA to the microaddress register. SAW is reset when RASA (ready to accept starting address), 714, FIG. 1, is received by the instruction decoder.

2.4.3.12 RASA

RASA (Ready to Accept Starting Address) is asserted by the MIS Control Logic when the starting address from the OPLA is being put onto the MAB. RASA signals the ID (which loops on SAW) to disassert SAW and go on.

2.4.3.13 LOOKAHEAD (LAH)

The Lookahead Flag was once a part of the MIS, but was subsequently moved to the ID logic. The Lookahead Flag is set when the ID completes a transition from state x (decode state). During the time that the Lookahead Flag is set, the ID is free to decode the next instruction, while the MIS is sequencing through the first. The ID must be more than one instruction ahead of the MIS, however. The Lookahead Flag is reset at the end of a ROM flow as indicated by executing an end-of-macro or end-of-branch-macro microinstruction.

2.4.3.14 DST

DST (Destination) is a flag which is reset to zero at the beginning of each macroinstruction and selectively set by the ID. This flag is tested in the MIS by the "Access Destination" and "Move Condition to Branch Flag" microinstructions. It is used to pass information from the Instruction Decoder to the MIS for the case of the Access Destination microinstruction. In this situation of the DST flag indicates whether "Access Memory" or "Access Stack" is intended. This allows certain microinstruction ROM flows which differ only in the type of memory references used to be written only once with the microinstruction "Access Destination" representing either kind of memory reference. At execution time the correct memory reference is substituted for "Access Destination."

A second DST flag called the OPLDST is used in the ID control logic for branches where OPLDST indicates whether the branch is absolute or relative.

2.4.3.15 T/F

The T/F (true/false) flag (795) is loaded by the execution unit via the T/F pin as a result of the return T/F microinstruction. It can also be loaded by the move-condition to branch-flag microinstruction. According to the last two bits of that microinstruction, the LAH, IPC or DST flags can be copied into the T/F flag. T/F is used by the MIS control logic during execution of conditional branch microinstructions and by the SPLA during conditional state branches.

2.5 Fault Control Logic

The fault control logic (778) latches, prioritizes, and flags the presence of all faults handled on the instruction unit. These faults include the following: (1) faults sent by the execution unit via the BP/F bus, (2) hardware ERRors (HERR), (3) bus ERRors (BERR), (4) invalid class faults (SIC), (5) ALARM, (6) interprocessor communications (IPC), and (7) TRACE. These faults are latched individually and remain latched until reset by either (1) the fault reset logic or (2) reset. The output of these latches are prioritized by the fault priority encoder. The fault priority encoder then asserts a flag indicating the presence of the highest priority fault. There are two such flags which may be asserted: (1) FLTI for immediate faults, (2) FLTM for fault on macros. After the MIS control logic has acknowledged the fault, the fault control logic resets that fault and flags any other faults pending.

2.6 Bus Interface Logic

The bus interface logic (780) monitors the bus during variable-length access-memory microinstructions and provides status information to the rest of the instruction unit. The major outputs of the bus interface logic are described below.

2.6.1 Valid Instruction Fetch Data (VIFD)

This output is asserted when there is valid instruction data on the ACD lines. The instruction decoder uses this signal to latch the instruction stream data.

2.6.2 Instruction Fetch Done (IFD)

This output is asserted with VIFD when the last double-byte of instruction data is valid on the ACD lines. It is used by the instruction decoder to terminate an instruction fetch.

2.6.3 Waiting for Last Cycle (WLC)

This is asserted while waiting for (during stretch) and during the last cycle of variable-length microinstructions. It is "anded" with ISB to force DNE causing the variable-length microinstruction to berminate.

2.6.4 Bus Error (BERR)

This output is asserted when ISB goes low during the cycle immediately following the last cycle of any access-memory microinstruction.

3.0 MIS LOGICAL MECHANISMS DESCRIPTION

The implementation of the microinstruction set solves the following problems: (1) the MIS receives microinstructions from two major sources and must service both sources, as well as send No-Ops when both sources are not ready, (2) there are some microinstructions which take more than a single cycle to complete, (3) two types of faults may come at any time and must be serviced under difficult conditions, (4) testing and initialization must be built in, and (5) the MIS is pipelined to achieve optimal performance; there are problems that come with pipelining.

Each cycle the MIS control logic needs to answer one question: What microinstruction should be sent to the execution unit? The many different criteria listed above need to be taken into account in order to answer the above question correctly. And what's more, the answer needs to be made quickly and once every cycle.

Another important question that needs to be answered when executing in a microinstruction ROM flow is: What is the ROM microaddress of the next microinstruction to be accessed from the ROM? Once the next microaddress has been computed or identified, the ROM needs almost a complete cycle to output the contents of that microaddress.

The problem of how to control the MIS can now be stated in closed form;

Given in a particular cycle, the status of:
1. the two sources of microinstructions,
2. multi- or variable-cycle microinstructions,
3. faults,
4. testing and initialization, and
5. the pipeline.

What is:
1. the next microinstruction, and
2. the next microaddress?

The following sections describe how this is accomplished in accordance with the present invention.

3.1 Sources of Microinstructions

The two major sources of microinstructions are: (1) forced microinstructions (310) from the instruction decoder, and (2) ROM flow microinstructions from the microprogram ROM (226). This second case requires a starting microaddress. There are two sources of starting addresses for ROM flows: (1) for normal flows, the starting address (783) is sent by the instruction decoder, and (2) for fault flows, the starting address is obtained from the fault control logic (i.e., ROM, 779). There are then two primary sources of microinstructions and/or starting addresses: (1) the instruction decoder, and (2) the fault control logic. This section will deal only with the instruction decoder as a source. The fault control logic as a source of staring addresses will be discussed later on in connection with faults.

The instruction decoder sends the MIS both forced microinstructions and starting addresses for microinstruction ROM flows. The protocol set-up for sending and receiving forced microinstructions and starting addresses is summarized below:

1. Forced microinstructions are buffered in the two-deep PIR FIFO (310) which acts as an interface between the instruction decoder and the MIS.
2. The instruction decoder may load a forced microinstruction as long as:
   (a) the PIR is not full, and
   (b) (implied) the instruction decoder is not stopped.
3. When the instruction decoder has a starting address it flags that fact by asserting SAW (starting address waiting) and stops.
4. The MIS always services a forced microinstruction (PIR not empty) over a starting address which may be waiting.
5. The MIS will service a starting address when:
   (a) SAW is asserted,
   (b) PIR-empty is asserted by loading the starting address into the microaddress register (MAR) and at the same time asserting ready-to-accept starting address (RASA) and setting the flow-active flag.
6. The instruction decoder upon recognition of RASA will disassert SAW and start itself again.

The above provides for the following:

1. Forced microinstructions and starting addresses are serviced by the MIS in the same order they were issued by the instruction decoder.
2. The instruction decoder never gets more than one macroinstruction ahead of the MIS.
3. A minimum number of cycles for the MIS are lost.

3.2 Microinstruction Lengths.

Microinstructions can be divided into three major divisions: (1) single cycle, (2) multicycle, and (3) variable-cycle microinstructions. Multicycle microinstructions can be either two- or three-cycles long. During each cycle of an instruction, the questions of what microinstruction or data should be sent to the execution unit and what the next microaddress should be have to be answered. More in terms of the hardware, the question can be restated symbolically:

?—>Interchip bus (ICB)
?—>Microaddress register (MAR)

These questions have been answered for each microinstruction shown in FIGS. 3-16. Each box represents one cycle and shows what should go onto the ICB and what is to go into the MAR during that particular cycle. FIGS. 4-16 illustrate instructions coming from the microprogram ROM (226) via the MIR (785). It should be understood, however, that most instructions (all but ROM flow control microinstructions; branch, etc.) can also come from the PIR (310) as well as the MIR (785); see for example, FIG. 3.

The following protocol was assumed for the case of multi- and variable-length instructions:

Multi- or variable-cycle microinstructions should not be interrupted during normal circumstances. This includes SAW, PIR not empty, extractor empty, or any faults (except HERR). This is accomplished by the CC1, CC∅, and DNE control signals. Multiple-cycle microinstructions cause the QPLA to change the state of the CC1 and CC∅ control signals. The meaning of the different states are summarized in the table in section 2.4.3.5.

As seen from the table, microinstruction boundary only occurs at CC1, CC∅=11. Only in this case can the MIS go on to service faults, flows, forced microinstructions, or starting addresses. The capability is also provided to execute two microinstructions from the microinstruction ROM without asserting a microinstruction boundary between them. This capability is needed when special timing between two microinstructions needs to be protected, or when information may be lost if the two microinstructions are interrupted. The microinstructions which use this feature are: Branch, Call Microsubroutine, Return, Conditional Branch, Perform Operation, and Restart. The restriction imposed on use of this feature is that these microinstructions cannot be forced by the Instruction Decoder. If one of them is forced, it will execute immediately afterwards a garbage microinstruction out of the microinstruction ROM from wherever this MAR was pointing.

Variable-length microinstructions are not executed using CC1, CC∅ because of timing. Instead, the control signal DNE is used to define the length of these microinstructions. When a variable-length microinstruction is detected, the QPLA asserts VLMI (Variable-Length Microinstruction). This signal goes to the DNE forming logic and causes DNE to be disasserted (to become Not Done). Not Done causes idle cycles (ICB<NOP, MAB<MAR). DNE becomes reasserted again when one of the following happens: (1) the DONE pin is asserted by the execution unit; (2) ISB is high while WLC (Waiting for Last Cycle) is asserted; (3) HERR fault is asserted; (4) INCRMA pin is asserted; or (5)

INIT pin is asserted. When asserted, DNE causes the S-Code priority encoder to stop sending idle cycles and to send the next microinstruction.

3.3 Faults

There are two different fault flags which may be asserted by the fault control logic (778). They are: (1) FLTI, and (2) FLTM.

First of all, FLTI must be serviced immediately at the end of the present microinstruction except when the "no boundary" feature is used. Note that an immediate fault cannot interrupt a multi- or a variable-cycle microinstruction. An exception to this is the HERR fault which aborts multi- and variable-cycle microinstructions. The microexecution unit, except in the case of timeout fault, sends a DONE, the cycle immediately following the FAULT. This aborts any variable (not multi-) cycle microinstruction which may have been in progress.

FLTM flag is only checked when the end-of-macroinstruction, end-of-branch-macro, or return-when-stack-is-empty microinstructions are executed. If when checked, the FLTM flag is set, the QPLA starts the fault routine. If when checked, FLTM is not asserted, then the QPLA goes on as normal.

The following table shows how the various faults are prioritized.

| Priority | CLASSIFICATION OF FAULTS<br>Fault-Name |
|---|---|
|   | *Fault Immediates |
| 1 | Hardware error (HERR) |
| 2 | Bus error (BERR) |
| 3 | Fault.computational<br>.Fault on flag<br>.Address development.not instruction fetch<br>.Data cache<br>.Segment table cache<br>.Altered |
| 4 | Fault.Address development.Instruction fetch.Not look-ahead |
| 5 | Invalid class.Not look-ahead |
|   | *End of macro / End of branch macro faults |
| 6 | Alarm |
| 7 | Interprocessor communication |
| 8 | Trace |
| 9 | Fault.Timeout |

3.4 Testing and Initialization

Initialization of the instruction unit is done by asserting the INIT pin. This has priority over everything: faults, flows, multiple-cycle microinstructions, etc. INIT forces a reset-processor microinstruction to the execution unit and starts an initialization ROM flow.

Testing is accomplished by the INCR microaddress pin. Asserting this pin causes the ROM to sequentially output (dump) the contents of the microinstruction ROM out onto the ICB. It is also of highest priority with the exception of the INIT function. The capability is also designed in for the MIS to continue execution of ROM code from the location where INCRMA left off. This is done by (1) starting a ROM flow, (2) asserting INCRMA until the desired microaddress is reached, and (3) lowering INCRMA.

3.5 S-CODE

The S-Code is a four-bit control code which is decoded by the various stacks and registers to obtain control information. The S-Code is originated in the MIS control logic (776) and bussed throughout the MIS. The following table gives the S-Code definitions.

| SSSS<br>3210 | >ICB | >MAR |
|---|---|---|
| 0000 | MIR | INC |
| 0001 | MIR | CLR |
| 0010 | MIR | STK |
| 0011 | MIR | DB |
| 0100 | — | — |
| 0101 | MIR | FLT |
| 0110 | — | — |
| 0111 | — | — |
| 1000 | PIR | MAR |
| 1001 | — | — |
| 1010 | IF | MAR |
| 1011 | TMP | MAR |
| 1100 | SLA | SAR |
| 1101 | RSTMEU | FLT |
| 1110 | XBF | MAR |
| 1111 | NOP | MAR |

3.6 MIS Priority Controller

The overall control of the MIS is accomplished by a priority encoder. The discussion of the various inputs and flags make it clear that certain signals have priority over other signals. See the table below.

| | MIS PRIORITY ENCODER | | | |
|---|---|---|---|---|
| Priority | Signal | S-Code | To ICB | To MAR |
| 1 | Initialize | 0001 | MIR | Clear |
| 2 | Increment Microaddress | 0000 | MIR | Incr |
| 3 | Not Microinstruction Boundary | (QPLA) | (QPLA) | (QPLA) |
| 3 | Not Done | 1111 | No-Op | MAR |
| 4 | Fault Immediate | 1101 | RST MEU | Flt Addr |
| 5 | Instruction Fetch | 1010 | In Fet | MAR |
| 6 | Flow Active | 0000 | MIR | Incr |
| 7 | Forced Microinstruction Waiting | 1000 | PIR | MAR |
| 8 | Starting Address Waiting | 1100 | Lkahd | SAR |
| 9 | Idle | 1111 | No-Op | MAR |

1. INIT, which resets the whole processor, occupies the position of highest priority.

2. INCR MA is used for chip-testing conditions, usually in conjunction with INIT. INCR MA holds the position of second priority, after INIT.

3. Not Microinstruction Boundary indicates that the MIS is in the process of executing a multi- or variable-length microinstruction, and hence "not at a microinstruction boundary." NOT DONE is asserted when a variable-length microinstruction is in progress. It is virtually the same as NOT Microinstruction Boundary in principle. However, they are treated separately because of implementation reasons. When in such a condition, no faults should be served, nor any other microinstructions started. This places NOT Microinstruction Boundary and NOT DONE third in the priority scheme.

4. Fault Immediates (FLTI) should be served immediately after the present microinstruction completed execution. FLTI is therefore one level of priority under NOT Microinstruction Boundary and NOT DONE.

5. One particular immediate fault, the Extractor Empty Fault, is handled as a special case because of its frequency and because it is easily serviced. Whereas most immediate faults require a fault-service routine to be executed out of the microinstruction ROM, the Extractor Empty Fault only needs a single microinstruction, Instruction Segment Read, to be executed. When no other immediate faults are pending, Extractor Empty causes the MIS to Force an Instruction Segment Read. The ID responds to that microinstruction by canceling the fault.

6. Forced microinstructions and starting addresses are not to be served while the MIS is executing a ROM flow. The flag FLOW ACTIVE is generated and used to indicate when the MIS is in a ROM flow. It is therefore of higher priority than NOT PIRMT and SAW, but lower than FLTI since an immediate fault can interrupt a ROM flow.

7. If not in a ROM flow (FLOW ACTIVE is not asserted), then the MIS starts any Forced Microinstructions that may be queued up in the PIR. The presence of a Forced Microinstruction waiting is indicated by PIR NOT EMPTY being asserted.

8. If not in a flow and no Forced Microinstructions are waiting, then the MIS checks to see if the ID has any flows to start as indicated by the assertion of SAW (Starting Address Waiting). If a Starting Address is waiting, then the MIS starts the flow and sets FLOW ACTIVE.

9. And finally, if no demands are being made on the MIS, it sits in the idle mode, IDLE being of last priority.

4.0 TYPICAL INSTRUCTION UNIT OPERATION

Refer to FIG. 2. At Time T=∅, the INIT input is asserted, which causes the ID (222) to empty the macroinstruction buffer (301) and the FIFOs (308, 310). Also, the ID resets the state machine (305) and sets itself to the stopped state ∅ in the S register.

The MIS (224) resets all faults and other saved conditions, starts a microinstruction flow from address ∅ in the ROM (226) and sends a reset processor microinstruction out on the microinstruction bus (220). In response to this microinstruction, the Execution Unit resets any internal fault conditions, stops any multiple-cycle microinstructions that may be in progress, and awaits new microinstructions from the MIS. The microinstruction flow started by the MIS and sent out over the microinstruction bus performs the necessary operations to initialize the processor in accordance with the procedures set forth in the above-identified Colley et al patent application. When there is a process to be run on the instruction unit/execution unit processor, the internal registers are loaded with all the necessary addressing information about the process' current environment. When the registers are loaded and the bit pointer and instruction pointer are initialized, the ID is started. When started, the ID requests instruction data to be fetched from main memory. The Execution Unit references main memory in response to microinstructions issued by the MIS, and the macroinstruction is transferred to the Instruction Unit from main memory. The instruction buffer (301) holds macroinstruction data received from main memory over the ACD bus (214). The bit pointer (302) indicates the bit position in the instruction buffer of the least significant bit of the next field to be decoded by the ID. Using the bit pointer, the composer matrix (765) presents the next n-bits of instruction data to be decoded by the state machine (305). The state machine decodes the instruction field, passes on any data or microinstructions to the FIFO (308, 310) and then updates the pointer by the bit length of the field just decoded.

For example, when decoding a simple scaler reference, the state machine first picks up the segment selector and then the displacement field of the instruction and loads them into the EXBUF FIFO (308). The state machine next forces a microinstruction from the TROM (307) to the PIR FIFO (310) that will cause the segment selector and the displacement to be transferred to the Execution Unit under control of the MIS (224).

The ID continues decoding fields until the data in the instruction buffer (301) is exhausted. The ID then goes not ready and requests that the MIS instruct the Execution Unit to fetch more instruction data from memory.

When the state machine (305) decodes the OP-CODE field of a macroinstruction, either a single microinstruction or a microinstruction flow is necessary to execute the instruction. In the case of a single microinstruction, the ID puts that microinstruction in the PIR FIFO (310). If the decoded macroinstruction requires a sequence of microinstructions for its execution, the ID issues a starting address of the microinstruction flow which is stored in the microprogram ROM (226). In this situation the MIS independently executes the specified microprogram flow from the ROM while the ID continues decoding the next macroinstruction.

Besides receiving single microinstructions and starting addresses for longer flows, the MIS receives fault information from the execution unit that have to be prioritized and serviced by the MIS. Encoded fault conditions are received by the MIS over the BP/F bus (217). The MIS services the fault by interrupting the normal flow of microinstructions to the Execution Unit and forcing a subroutine call to a special fault handle in the microprogram ROM (226). When the fault subroutine completes its operation, it returns from the subroutine and the normal flow of microinstructions is started-up by the MIS.

Two types of faults are handled by the MIS: immediate faults and end-of-macroinstruction faults. Within each category the faults are handled in priority order. Immediate faults indicate that the fault condition must be serviced as soon as the currently-executing microinstruction completes. End-of-macroinstruction faults are of a less serious nature and are not serviced until the current macroinstruction has completed execution, as indicated by an end-of-macroinstruction microinstruction.

In addition to issuing microinstructions to the Execution Unit and handling fault conditions, the MIS also has to interpret and execute a few microinstructions that control the internal operation of the MIS and ID. For example, these microinstructions perform such operations as starting and stopping the ID, loading the ID's bit pointer, etc. (The MIS microinstructions are described in detail under Section 11 "Instruction Unit/Execution Unit Microinstruction Set" in the above-identified Colley et al patent application.)

A macroinstruction decoded by the ID may require only a single microinstruction to be transferred to the Execution Unit in order to execute a part of the macroinstruction, or a microinstruction flow involving two or more microinstructions may be required to be sent to the Execution Unit to perform a particular function. Single-cycle microinstructions may originate in the ROM (226) as illustrated by FIG. 4. In this case, the contents of the MIR (785) are transferred to the microinstruction bus and the MAR (312) is then incremented by one through adder 314. It is also possible that the ID (222) may force a microinstruction across the bus (220) as illustrated in FIG. 3. In this case the microinstruction is transferred to the PIR (310), the contents of the PIR is then placed on the ICB (787), and the contents of the MAR (312) remain unchanged. The instruction decoder may force a microinstruction in this manner as long as the PIR is not empty.

Some microinstructions require several cycles to complete. The decoder (794) decodes these multiple-cycle microinstructions to determine how many cycles it takes to complete it. A count is maintained by the control bits, CC0, CC1 (793). The microinstruction is transferred over the microinstruction bus (220) to the Execution Unit which decodes and executes it.

In the case of a common double-cycle microinstruction shown in FIG. 5, during the second cycle the MIS is idle and a NO-OP is transferred to the ICB (787) and the MAR (312) is not incremented.

In the case of a branch, shown in FIG. 6, within the ROM (226) during the second cycle, the contents of the MIR (785) are transferred to the ICB and the contents of the decoder bus DB (i.e., the decoder register) are transferred to the MAR (312), thus providing the branch address for the next microinstruction.

In the case of a restart microinstruction, shown in FIG. 7, the contents of the temporary stack TMP (791) are transferred to the ICB on the second cycle while the MAR is not incremented.

In the case of a transfer-data microinstruction, as shown in FIG. 8, the contents of the EXBUF (308) are transferred to the ICB during the second cycle, and the contents of the MAR are not incremented.

A conditional branch, shown in FIG. 9, is similar to the branch shown in FIG. 6 with the exception that the true/false flag (795) is tested to see if the condition returned by the Execution Unit is true or false. If true, the branch is taken on the second cycle as previously described with respect to FIG. 6. If false, a NO-OP is placed on the bus for the second cycle.

Referring to FIG. 10, the access-destination microinstruction is shown. The DST (destination) is a flip-flop set by the ID to indicate whether access memory or access stack is intended. If a zero, the access-memory microinstruction (786) is gated onto the ICB. If a one, the access-stack microinstruction (786) is gated to the ICB. In either case, the microaddress register is not incremented.

FIG. 11 illustrates the return microinstruction. During the second cycle, status flags set by the MIS control logic (776) are tested. The STKMT (microaddress stack empty) is asserted when there are no return microaddresses in the microaddress stack (316). If this flag is not asserted, during the second cycle of the microinstruction, the contents of the MIR are transferred to the ICB, the next microaddress in the stack (316) is transferred to the MAR (312), and the flow-active flag is set. If the STKMT flag is asserted, there are not any return microaddresses left in the stack and the return from the microinstruction routine is accomplished during the second cycle by placing a NO-OP on the ICB, by not incrementing the MAR, and by resetting the flow-active flag.

FIG. 12 illustrates the end-of-macro microinstruction. The end-of-macro microinstruction tests the FLTM flag so that any end-of-macro instruction subroutine called faults can be started. If the flag is set, a RESET-microexecution-unit-fault-state microinstruction is transferred to the ICB, the output of the fault ROM (FLT) is transferred to the MAR, and the flow-active flat is set. If no faults are pending, the FLTM is zero and a NO-OP is transferred to the ICB, the MAR is not incremented, and the flow-active flag is reset.

Figure 13:
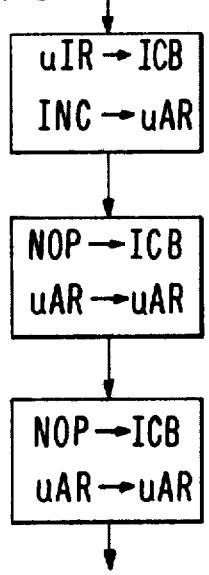
FIGS. 13-15 are flow diagrams illustrating triple-cycle microinstructions.
Figure 14:
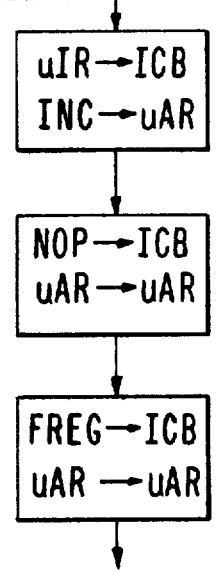
Figure 15:
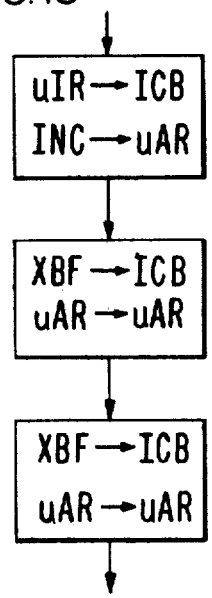

Triple-cycle microinstructions are illustrated in FIGS. 13, 14, and 15.

A common microinstruction, shown in FIG. 13, is implemented on the second and third cycles by transferring the NO-OP constant (782) to the ICB while not incrementing the MAR (312). This allows the MIS to cycle two cycles while the Execution Unit is executing the microinstruction for the same two cycles.

The transfer-operator-fault-encoding microinstruction is illustrated in FIG. 14. The 8-bit fault encoding saved on the Instruction Unit when the current instruction OP-CODE was decoded is transferred over the microinstruction bus (220) to the Execution Unit and stored on the displacement stack. During the third cycle of execution the contents of the operator-fault-encoding register (788) are transferred to the ICB. The MAR is not incremented.

The transfer-logical-address microinstruction is illustrated in FIG. 15. Two double-byte values are transferred from the EXBUF FIFO (308) over the microinstruction bus (220) to the segment selector stack and the displacement stack on the Execution Unit. During the second cycle the segment selector in the EXBUF is transferred to the ICB. The MAR is not incremented. During the third cycle, the displacement value in the EXBUF is transferred to the ICB. The MAR is not incremented on this cycle.

Some microinstructions require a variable number of cycles to complete. For example, memory- and operand-stack-access microinstructions and the perform-operation microinstruction.

Figure 16:
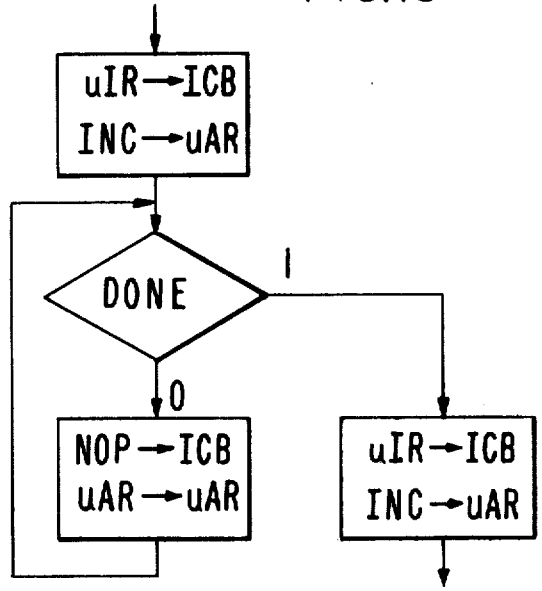
FIG. 16 is a flow diagram illustrating variable-cycle microinstructions.

For access-memory types of microinstructions, the Execution Unit loads a counter with the operand length (i.e., the number of times it has to go to the memory to fetch 16-bit quantities). An access sequencer on the Execution Unit makes the memory references, and for each reference decrements the counter. A done signal is issued one cycle before this counter goes to zero. This enables the MIS to start-up. As illustrated in FIG. 16, the MIS is idling while the operation on the Execution Unit is going on. This is accomplished by testing the done line and issuing a NO-OP to the ICB, when the done line is zero.

For perform-operation types of microinstructions, a math sequencer on the Execution Unit stores ROM flows for arithmetic operations such as division, multiplication, and square root. A perform-operation microinstruction includes a field which specifies the type of operation to be performed. The Execution Unit starts the appropriate ROM flow and one cycle before the operation is completed, it asserts the done line to the Instruction Unit. In this case, during the second cycle shown in FIG. 16, the MIS places the next microinstruction on the ICB, and increments the microaddress register.

While the invention has been particularly shown and described with reference to preferred embodiments thereof, it will be understood by those skilled in the art that various changes in form and details may be made therein without departing from the spirit and scope of the invention.

What is claimed is:

1. For use in a data processing system including a main memory, a microprocessor instruction unit comprising:
- an instruction decoder including means for receiving a macroinstruction from said main memory, means connected to said receiving means for interpreting said macroinstruction, said receiving means including first means for generating starting addresses for microinstruction routines, said microinstruction routines comprised of a plurality of microinstructions, and second means for generating single microinstructions, one microinstruction at a time;
- a microinstruction sequencer to said instruction decoder; and,
- an output bus connected to said a microinstruction sequencer;
- said microinstruction sequencer including microprogram storage means for storing said microinstruction routines and means connected to said storing means for sequencing through the microinstructions comprising particular ones of said microinstruction routines necessary to execute a macroinstruction received by said instruction decoder, said microinstruction sequencer including third means connected to said first means for receiving said starting addresses generated by said first means, said starting addresses being for said microinstruction routines stored in said storing means, fourth means connected to said second means for receiving said single microinstructions generated by said second means, and fifth means connected to said microprogram storage means and to said fourth means for placing said microinstructions comprising said particular ones of said microinstruction routines and said single microinstructions on said output bus.

2. The combination in accordance with claim 1 further comprising:
- microinstruction buffering means connected between said second and fourth means for buffering said single microinstructions between said instruction decoder and said microinstruction sequencer,
- said microinstruction buffering means including sixth means under control of said sequencer connected to said fourth means, for selectively inhibiting and not inhibiting the generation of said single microinstructions by said fourth means.

3. The combination in accordance with claim 2 wherein:
- said sixth means comprises a control flag settable to a first inhibiting state by said buffering means upon the condition that said buffering means is full and resettable to a second not-inhibiting state by said sequencer.

4. The combination in accordance with claim 2 wherein:
- said instruction decoder further comprises seventh means for interpreting particular fields of an instruction to provide data;
- said microinstruction sequencer further comprises control means for transferring data over said output bus; and said instruction unit further comprises:
- data buffering means between said instruction decoder and said microinstruction sequencer, said data buffering means being connected to said seventh means and to said output bus, for buffering said data between said instruction decoder and said microinstruction sequencer.

5. The combination in accordance with claim 4 wherein said microinstruction sequencer control means further includes means for executing a said single microinstruction buffered in said microinstruction buffering means, said single microinstruction being of a type directing the transfer of data from said data buffer to said output bus,
- said microinstruction sequencer control means further including means for causing data in said data buffering means to be transferred over said output bus only upon the condition that a corresponding microinstruction stored in said microinstruction buffering means is executed by said microinstruction sequencer.

6. The combination in accordance with claim 2 further comprising:
- means in said microinstruction sequencer connected to said third means for placing said instruction decoder in a look-ahead mode upon the receipt of one of said starting addresses from said instruction decoder, including means for setting a flow-active flag.

7. The combination in accordance with claim 6 wherein said microinstruction buffering means includes means connected to said microinstruction sequencer, for indicating that said microinstruction buffer is empty, said combination further comprising:
- means in said microinstruction sequencer responsive to said indicating means for accepting a starting address from said first means in said instruction decoder upon the condition that said indicating means indicates that said microinstruction buffering means is empty to thereby prevent said sequencer from commencing a new microinstruction flow before prior instructions decoded by said instruction decoder have been processed.

8. The combination in accordance with claim 2 wherein said means for receiving a macroinstruction comprises a first-in, first-out buffer for buffering at least two words, each word being part of a macroinstruction made up of a plurality of words, said instruction unit further comprising:
- means capable of stacking at least two starting-bit pointers, so that the starting-bit pointer of a first instruction being executed by said sequencer and the starting-bit pointer of a second instruction being decoded concurrently by said instruction decoder may be stored therein,
- whereby said starting-bit pointer of said first instruction may be used by said instruction decoder to extract field information from said buffer to thereby decode a new instruction, while said sequencer completes executing a previous instruction, said bit pointer for said previous instruction being stored for use by said sequencer for recovery from a fault condition.

9. For use in a data processing system including a main memory for storing macroinstructions, said macroinstructions including a field specifying either a first executable operation requiring a single microinstruction to execute, or a second executable operation requiring a series of microinstructions to execute, and an execution unit for executing said microinstructions, a microprocessor instruction unit comprising:
- an instruction decoder for receiving macroinstructions from said main memory;
- said instruction decoder including means for interpreting said field of said macroinstructions to provide first signals indicating that said field specifies said first executable operation requiring a single microinstruction to execute, or that said field specifies said second executable operation requiring a series of microinstructions to execute, said instruction decoder including first means connected to said interpreting means and responsive to said second signals for generating starting addresses for microinstruction routines, said microinstruction routines being comprised of a series of microinstructions, and, said instruction decoder including second means connected to said interpreting means and responsive to said first signals for generating single microinstructions;

said instruction decoder including control means connected to said interpreting means and to said first and second means for activating said first means or said second means to thereby cause starting addresses or single microinstructions to be generated in response to said second or first signals, respectively;

a microinstruction sequencer for sequencing through said series of microinstruction comprising said microinstruction routines;

said microinstruction sequencer including third means connected to said first means for receiving said starting addresses for said microinstruction routines, said microinstruction sequencer including fourth means connected to said second means for receiving said single microinstructions, said microinstruction sequencer including fifth means connected to said third and fourth means for decoding said microinstructions, and said microinstruction sequencer including sixth means responsive to said fifth means for transferring microinstructions to said execution unit;

microinstruction sequencer control means;

a first-in, first-out buffer connected between said second means and said fourth means for buffering single microinstructions received from said second-generating means;

seventh means connected to said instruction decoder and to said first-in first-out buffer for transferring said single microinstructions from said second means to said first-in, first-out buffer under control of said instruction decoder control means;

eighth means connected to said microinstruction sequencer and to said first-in first-out buffer for transferring said single microinstructions from said first-in, first-out buffer to said fourth means under control of said microinstruction sequencer control means;

said first-in, first-out buffer including a flag bit, said flag bit being settable to a first state by said seventh means to indicate that said first-in, first-out buffer is full, and said flag bit being resettable to a second state to indicate that said first-in, first-out buffer is not full;

ninth means connected to said instruction decoder and to said flag bit for setting said flag bit; and tenth means connected to said microinstruction sequencer control means and to said flag bit for resetting said flag bit.

10. The combination in accordance with claim 9 wherein said instruction decoder further includes a state register for placing said instruction decoder in successive new states whereby said interpreting means is placed in a condition to interpret successive new fields of a macroinstruction; and eleventh means connected to said state register and to said said first-in, first-out buffer responsive to said flag bit for preventing said state register from changing to a new state, upon the condition that said flag bit is in said first state indicating that said first-in, first-out buffer is full.

11. The combination in accordance with claim 1 wherein said microprocessor is partitioned between separate chips with an execution unit on one chip, said execution unit including means for accepting microinstructions over a microinstruction bus, means for executing said microinstructions, means for encoding a fault condition existing on said execution unit, and means for placing said fault encoding on a fault bus, and wherein said means for storing said microinstruction routines has stored therein a fault routine starting address, said microinstruction sequencer further comprising:

fault address storing means for storing a plurality of starting addresses, each starting address corresponding to one of a plurality of fault microinstruction routines;

control means connected to said fault bus, said control means including first means responsive to said fault bus for indicating the presence of a fault encoding on said fault bus, and second means responsive to said fault encoding on said fault bus for selecting an appropriate starting address of a fault microinstruction routine from said fault address storing means depending upon the value of said fault encoding.

12. The combination in accordance with claim 11 wherein said microinstruction sequencer further comprises:

fault control means for sequencing through a series of microinstructions necessary to execute said fault microinstruction routine, said microinstruction sequencer including fifth means responsive to said fault address storing means for receiving said selected starting address of a fault microinstruction routine and sixth means connected to said fifth means and to said output bus for sequentially placing the microinstructions comprising said selected fault microinstruction routine on said output bus.

13. The combination in accordance with claim 1 wherein said microprocessor is partitioned between separate chips with an execution unit on one chip, said execution unit including means for accepting a conditional branch microinstruction over a microinstruction bus, said branch microinstruction encoded to test the status of a condition existing or not existing on said execution unit; said execution unit including means for energizing a true/false output line upon the condition that said condition tested exists, said microinstruction sequencer further comprising:

a branch condition flag bit, capable of being tested by a microinstruction executing on said instruction unit;

fourth means connected to said branch condition flag bit for connecting said instruction unit to said true/false line on said execution unit;

fifth means responsive to energization of said true/false line for setting said branch condition flag bit on said instruction unit and, fifth means connected to said branch condition flag bit for causing execution of microinstructions on said instruction unit to continue at a specified branch address.

* * * * *